(12) United States Patent
Kobayashi et al.

(10) Patent No.: US 12,109,814 B2
(45) Date of Patent: Oct. 8, 2024

(54) LIQUID EJECTING APPARATUS AND LIQUID EJECTING HEAD

(71) Applicant: SEIKO EPSON CORPORATION, Tokyo (JP)

(72) Inventors: Haruki Kobayashi, Matsumoto (JP); Atsushi Muto, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 127 days.

(21) Appl. No.: 17/823,045

(22) Filed: Aug. 29, 2022

(65) Prior Publication Data

US 2023/0068149 A1  Mar. 2, 2023

(30) Foreign Application Priority Data

Aug. 31, 2021 (JP) ................................ 2021-140971

(51) Int. Cl.
*B41J 2/14* (2006.01)

(52) U.S. Cl.
CPC .................................. *B41J 2/1433* (2013.01)

(58) Field of Classification Search
CPC ... B41J 2/14; B41J 2/1433; B41J 2/155; B41J 2/16508; B41J 2/16511; B41J 2/16526; B41J 2/16532; B41J 2/16585; B41J 2025/008; B41J 2/17556; C09D 11/322
See application file for complete search history.

(56) References Cited

U.S. PATENT DOCUMENTS

2014/0043394 A1   2/2014  Ishikawa et al.
2020/0108613 A1*  4/2020  Tsuji .................... B41J 2/16588

FOREIGN PATENT DOCUMENTS

JP     2014-034170 A    2/2014
JP     2017080898    *  5/2017  ............... B41J 2/01

* cited by examiner

*Primary Examiner* — Anh T Vo
(74) *Attorney, Agent, or Firm* — WORKMAN NYDEGGER

(57) ABSTRACT

A liquid ejecting apparatus includes a liquid ejecting head that has an ejection surface including a first nozzle row configured to eject a first ink and a second nozzle row configured to eject a second ink. The liquid ejecting head is configured to be held in a first posture in which the ejection surface is inclined with respect to a horizontal plane. The dynamic surface tension of the first ink is higher than the dynamic surface tension of the second ink. In the first posture, the first nozzle row is positioned above the second nozzle row with respect to a gravity direction.

18 Claims, 19 Drawing Sheets

FIG. 13

| TYPE OF INK | FIRST INK | SECOND INK | THIRD INK | FOURTH INK |
|---|---|---|---|---|
| PIGMENT DISPERSION LIQUID 1 (%) | | 35.0 | | |
| PIGMENT DISPERSION LIQUID 2 (%) | 30.0 | | | |
| PIGMENT DISPERSION LIQUID 3 (%) | | | 30.0 | |
| PIGMENT DISPERSION LIQUID 4 (%) | | | | 30.0 |
| GLYCERIN (%) | 12.0 | | 12.0 | 12.0 |
| TRITYL PROPANE (%) | 10.0 | 10.0 | 10.0 | 10.0 |
| 1,2-HEXANEDIOL (%) | 3.0 | 1.0 | 1.0 | 4.0 |
| 1-PENTANOL (%) | | 12.0 | | |
| ACETYLENOL E100 (%) | 0.4 | 1.0 | | 0.2 |
| ACETYLENOL E60 (%) | | 1.7 | 0.9 | 1.3 |
| ION-EXCHANGED WATER (%) | 44.6 | 39.3 | 46.1 | 42.5 |
| DYNAMIC SURFACE TENSION γ (mN/m) | 41.0 | 29.0 | 40.0 | 32.0 |
| | BLACK | CYAN | YELLOW | MAGENTA |

LIQUID EJECTING APPARATUS AND LIQUID EJECTING HEAD

The present application is based on, and claims priority from JP Application Serial Number 2021-140971, filed Aug. 31, 2021, the disclosure of which is hereby incorporated by reference herein in its entirety.

BACKGROUND

1. Technical Field

The present disclosure relates to a liquid ejecting apparatus and a liquid ejecting head.

2. Related Art

In a recording head that ejects a plurality of types of inks, an ejection surface for ejecting an ink is inclined with respect to a horizontal plane in some cases (for example, see JP-A-2014-34170).

The dynamic surface tension of an ink differs for each type of ink in some cases. In the related art, a relationship of a combination of an effect of different dynamic surface tensions of the plurality of inks and an effect of a case where the ejection surface is inclined has not been considered.

SUMMARY

According to an aspect of the present disclosure, there is provided a liquid ejecting apparatus including a liquid ejecting head that has an ejection surface including a first nozzle row for ejecting a first ink and a second nozzle row for ejecting a second ink, in which the liquid ejecting head is configured to be held in a first posture in which the ejection surface is inclined with respect to a horizontal plane. A dynamic surface tension of the first ink is higher than a dynamic surface tension of the second ink. In the first posture, the first nozzle row is positioned above the second nozzle row in a gravity direction.

According to another aspect of the present disclosure, there is provided a liquid ejecting apparatus including a first liquid ejecting head that has a first ejection surface including a first nozzle which ejects a first ink and a second liquid ejecting head that has a second ejection surface including a second nozzle which ejects a second ink. A dynamic surface tension of the first ink is higher than a dynamic surface tension of the second ink. The first ejection surface is disposed such that an angle formed by an ejection direction of the first ink ejected from the first nozzle and a gravity direction is a first angle, and the second ejection surface is disposed such that an angle formed by an ejection direction of the second ink ejected from the second nozzle and the gravity direction is a second angle larger than the first angle.

According to still another aspect of the present disclosure, there is provided a liquid ejecting head including a first nozzle row that is used for ejecting a first ink, a second nozzle row that is used for ejecting a second ink, and a third nozzle row that is used for ejecting a third ink. A dynamic surface tension of the third ink is lower than a dynamic surface tension of the first ink and is higher than a dynamic surface tension of the second ink. The third nozzle row is positioned between the first nozzle row and the second nozzle row in a gravity direction.

BRIEF DESCRIPTION OF THE DRAWINGS

FIG. 13 is a table showing components of an ink according to an example.

DESCRIPTION OF EXEMPLARY EMBODIMENTS

Hereinafter, embodiments for carrying out the present disclosure will be described with reference to the drawings. However, in each drawing, the dimensions and scale of each portion are different from the actual dimensions and scale as appropriate in some cases. In addition, since the embodiments to be described below are suitable specific examples of the present disclosure, various technically preferable limitations are attached, but the scope of the present disclosure is not limited to the forms unless stated otherwise to limit the present disclosure in the following description.

In the following description, three directions intersecting each other will be described as an X-axis direction, a Y-axis direction, and a Z-axis direction in some cases. The X-axis direction includes an X1 direction and an X2 direction which are directions opposite to each other. The X-axis direction is an example of a first direction. The Y-axis direction includes a Y1 direction and a Y2 direction which are directions opposite to each other. The Y-axis direction is an example of a second direction. The Z-axis direction includes a Z1 direction and a Z2 direction which are directions opposite to each other. The X-axis direction, the Y-axis direction, and the Z-axis direction are orthogonal to each other. The Y-axis direction and the Z-axis direction are directions having an ejection surface F1 to be described later as reference.

In addition, a downward direction of a gravity direction will be described as a gravity direction G1, and a direction orthogonal to both of the gravity direction G1 and the X-axis direction will be described as a K-axis direction. In addition, an opposite direction to the gravity direction G1 will be defined as an upward direction G2. The K-axis direction includes a K1 direction and a K2 direction which are directions opposite to each other. The K-axis direction is an example of a third direction. The K-axis direction is an example of a horizontal direction. The horizontal direction is a direction orthogonal to the gravity direction G1. The third direction is a direction orthogonal to both of the first direction and the gravity direction G1.

Figure 1:
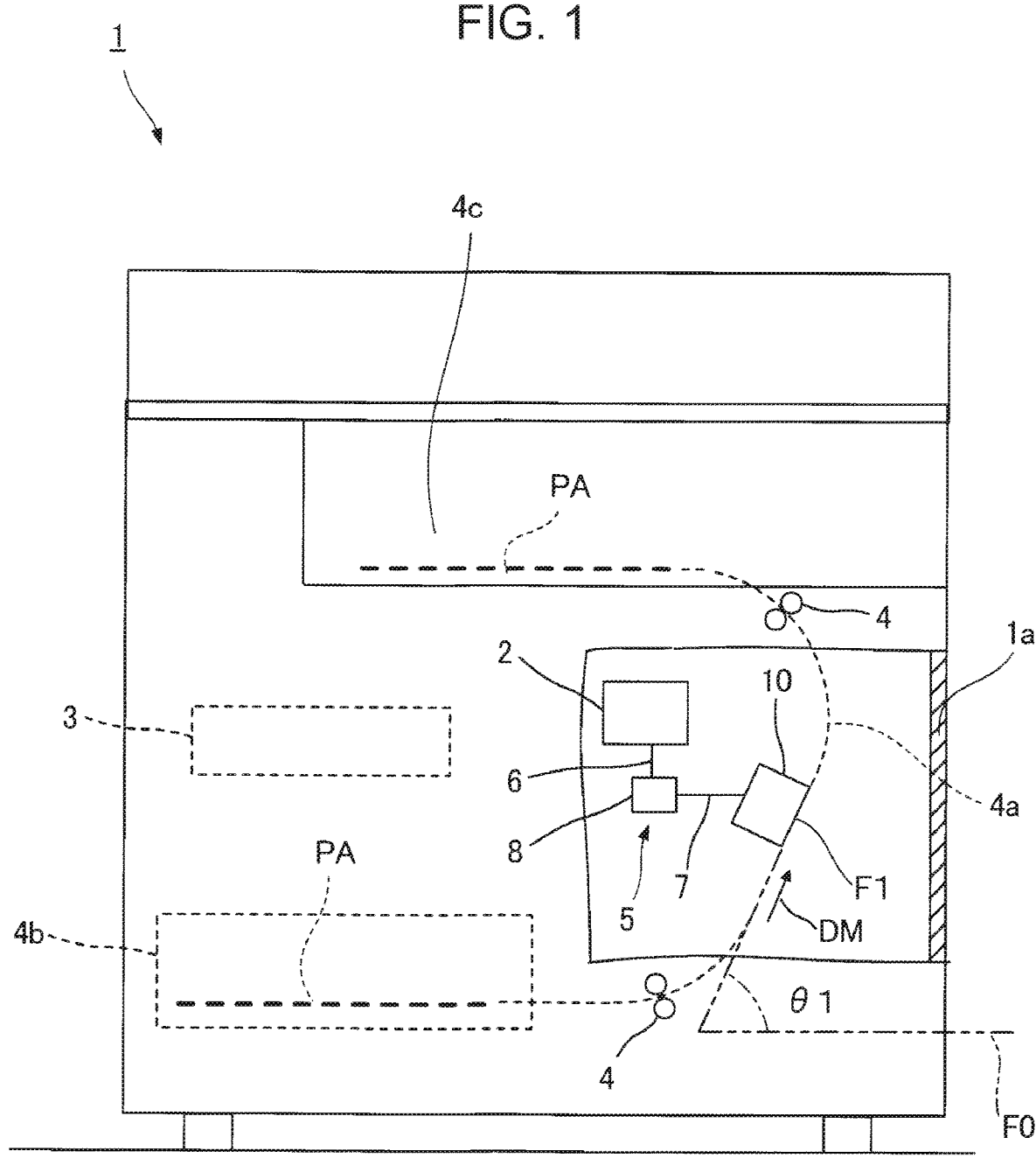
FIG. 1 is a schematic view showing a liquid ejecting apparatus according to a first embodiment.
Figure 2:
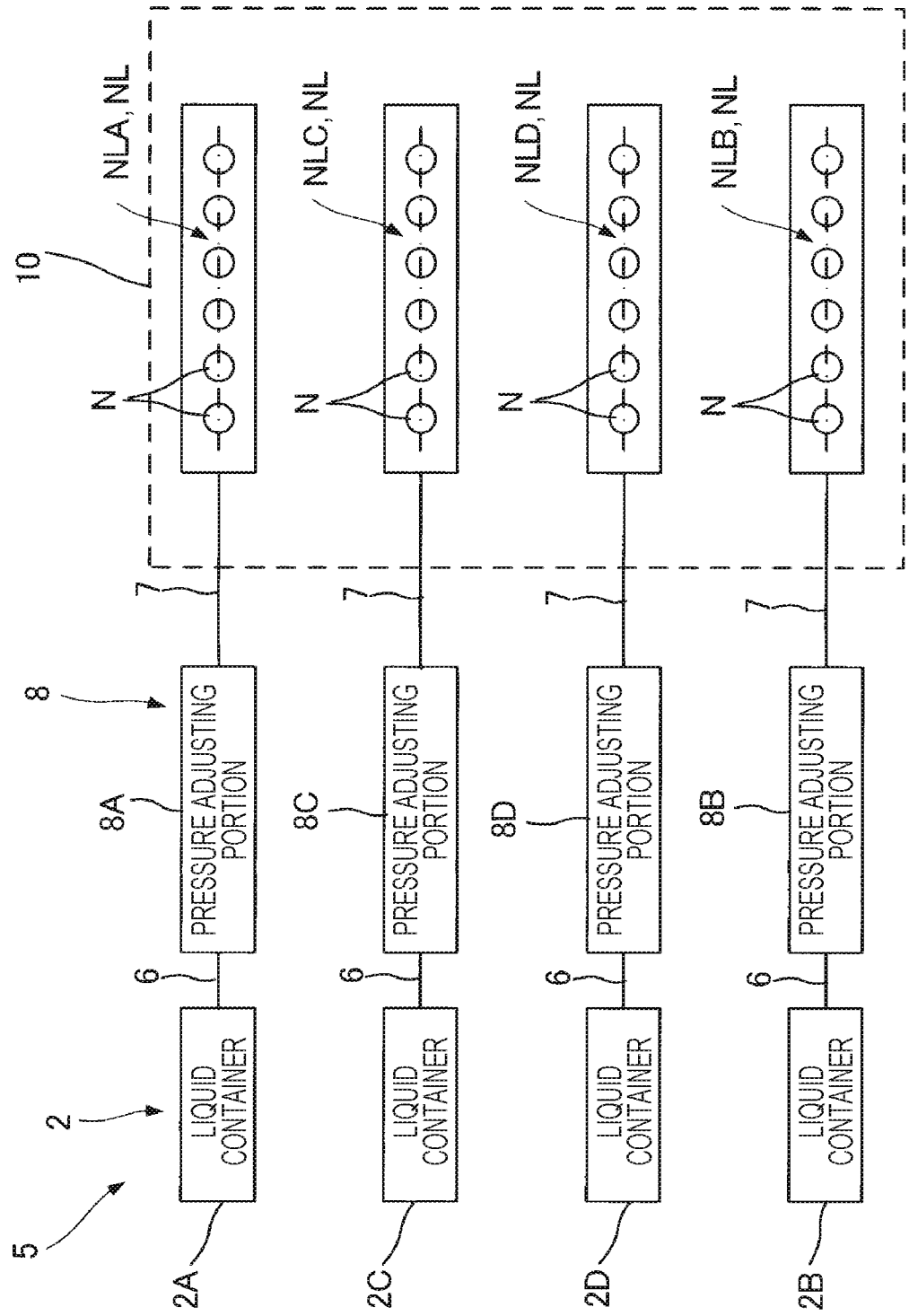
FIG. 2 is a block diagram showing an ink flow path.

FIG. 1 is a schematic view showing a liquid ejecting apparatus 1 according to a first embodiment. FIG. 2 is a block diagram showing an ink flow path. The liquid ejecting apparatus 1 is an ink jet type printing apparatus that ejects an ink, which is an example of a "liquid", to a medium PA as ink droplets. The liquid ejecting apparatus 1 is a so-called line type printing apparatus in which a plurality of nozzles ejecting an ink are distributed over the entire range in a width direction of the medium PA. The medium PA is typically printing paper. The medium PA is not limited to the printing paper and may be, for example, a printing target made of any material such as a resin film and cloth.

The liquid ejecting apparatus 1 includes a liquid ejecting head 10 that has the ejection surface F1 inclined with respect to a horizontal plane F0. The liquid ejecting apparatus 1 includes a plurality of liquid containers 2, a control unit 3, a medium transporting mechanism 4, an ink supply unit 5, and the liquid ejecting head 10. The liquid ejecting apparatus 1 may include one liquid ejecting head 10 or may include a plurality of liquid ejecting heads 10. The liquid ejecting apparatus 1 of the present embodiment includes one liquid ejecting head 10. When the plurality of liquid ejecting heads 10 are included, the plurality of liquid ejecting heads 10 are arranged in the X-axis direction to configure a line head.

The control unit 3 controls an operation of each element of the liquid ejecting apparatus 1. The control unit 3 includes, for example, a processing circuit such as a CPU and an FPGA and a storage circuit such as a semiconductor memory. The storage circuit stores various types of programs and various types of data. The processing circuit realizes various types of control by executing the program and using the data as appropriate. The CPU is an abbreviation for a central processing unit. The FPGA is an abbreviation for a field programmable gate array.

The medium transporting mechanism 4 is controlled by the control unit 3 and transports the medium PA in a transport direction DM. The transport direction DM is a transport direction of the medium PA at a position facing the ejection surface F1 and is parallel to or substantially parallel to the Y-axis direction. The medium transporting mechanism 4 includes a transport roller that is long along the width direction of the medium PA and a motor that rotates the transport roller. The medium transporting mechanism 4 is not limited to the configuration using the transport roller and may have, for example, a configuration using a drum or an endless belt that transports the medium PA in a state where the medium PA is adsorbed to an outer peripheral surface because of an electrostatic force.

A medium transport path 4a through which the medium PA is transported is formed in the liquid ejecting apparatus 1. The medium transport path 4a is a path from a feeding portion 4b to a discharging portion 4c. The medium transporting mechanism 4 transports the medium PA along the medium transport path 4a. The feeding portion 4b and the discharging portion 4c include a tray capable of storing the medium PA.

The liquid container 2 stores an ink. Examples of a specific embodiment of the liquid container 2 include a cartridge that can be attached/detached with respect to the liquid ejecting apparatus 1, a bag-shaped ink pack formed of a flexible film, and an ink tank that can be refilled with an ink. A type of ink to be stored in the liquid container 2 can be any type.

The liquid container 2 includes liquid containers 2A, 2B, 2C, and 2D. The liquid container 2A stores a first ink. The liquid container 2B stores a second ink. The liquid container 2C stores a third ink. The liquid container 2D stores a fourth ink. For example, the first ink, the second ink, the third ink, and the fourth ink are inks having colors different from each other. The first ink, the second ink, the third ink, and the fourth ink have dynamic surface tensions different from each other. The dynamic surface tension of the first ink is higher than the dynamic surface tension of the second ink. The dynamic surface tension of the third ink is lower than the dynamic surface tension of the first ink and is higher than the dynamic surface tension of the second ink. The dynamic surface tension of the fourth ink is lower than the dynamic surface tension of the third ink and is higher than the dynamic surface tension of the second ink. A component for each type of ink and measurement of a dynamic surface tension will be described later.

A difference between the dynamic surface tension of the first ink and the dynamic surface tension of the second ink is 1.0 mN/m or larger. When a lifetime is set to 10 msec in measurement of a dynamic surface tension to be described later, the dynamic surface tension of the first ink is higher than the dynamic surface tension of the second ink. When the lifetime is set to 10 msec, the dynamic surface tension of the first ink is higher than that of the third ink, the dynamic surface tension of the third ink is higher than that of the fourth ink, and the dynamic surface tension of the fourth ink is higher than that of the second ink.

The ink supply unit 5 has ink flow paths 6 and 7, through which an ink is supplied from the liquid containers 2 to the liquid ejecting head 10, and a pressure adjusting portion 8 that adjusts the pressure of an ink in the liquid ejecting head 10. The ink flow path 6 includes a flow path from the liquid containers 2 to the pressure adjusting portion 8. The ink flow path 7 includes a flow path from the pressure adjusting portion 8 to the liquid ejecting head 10. The ink flow path 7 includes a flow path formed in the liquid ejecting head 10. The ink flow paths 6 and 7 include, for example, a flow path member, a pipe, and a tube in which a groove, a recessed portion, or a through-hole is formed.

The pressure adjusting portion 8 adjusts the pressure of an ink to be supplied to the liquid ejecting head 10 such that a predetermined pressure acts on a nozzle N. The pressure adjusting portion 8 is, for example, a negative pressure generating portion including a pressure adjusting valve. The negative pressure generating portion may be configured, for example, to have the pressure adjusting valve that opens/closes the ink flow path and a flexible member that bends based on a differential pressure between the pressure of the ink flow path downstream of the pressure adjusting valve and the atmospheric pressure and to control the opening/closing of the pressure adjusting valve such that a negative pressure in a predetermined range acts on the nozzle N as the pressure adjusting valve is moved because of the bending of the flexible member.

In addition, the pressure adjusting portion 8 may adjust the pressure of an ink to be supplied to the liquid ejecting head 10 with a sub-tank that temporarily stores the ink. Specifically, the pressure adjusting portion 8 may have the sub-tank and any sensor that can detect a stored amount of an ink in the sub-tank and adjust the pressure of an ink in the liquid ejecting head 10 by a water head difference between a liquid surface in the sub-tank and the liquid ejecting head 10 by keeping the stored amount of the ink in the sub-tank substantially constant, that is, keeping the liquid surface of the ink stored in the sub-tank substantially constant as the ink is refilled from the liquid containers 2 once the stored amount of the ink in the sub-tank detected by the sensor has become smaller than a threshold. In addition, the pressure of the ink to be supplied to the liquid ejecting head 10 may be adjusted by setting a pressure in the sub-tank to a predetermined pressure with a compressor.

The pressure adjusting portion 8 includes pressure adjusting portions 8A, 8B, 8C, and 8D. The pressure adjusting portion 8A communicates with the liquid container 2A and adjusts the pressure of the first ink. The pressure adjusting portion 8B communicates with the liquid container 2B and adjusts the pressure of the second ink. The pressure adjusting portion 8C communicates with the liquid container 2C and adjusts the pressure of the third ink. The pressure adjusting portion 8D communicates with the liquid container 2D and adjusts the pressure of the fourth ink.

Figure 3:
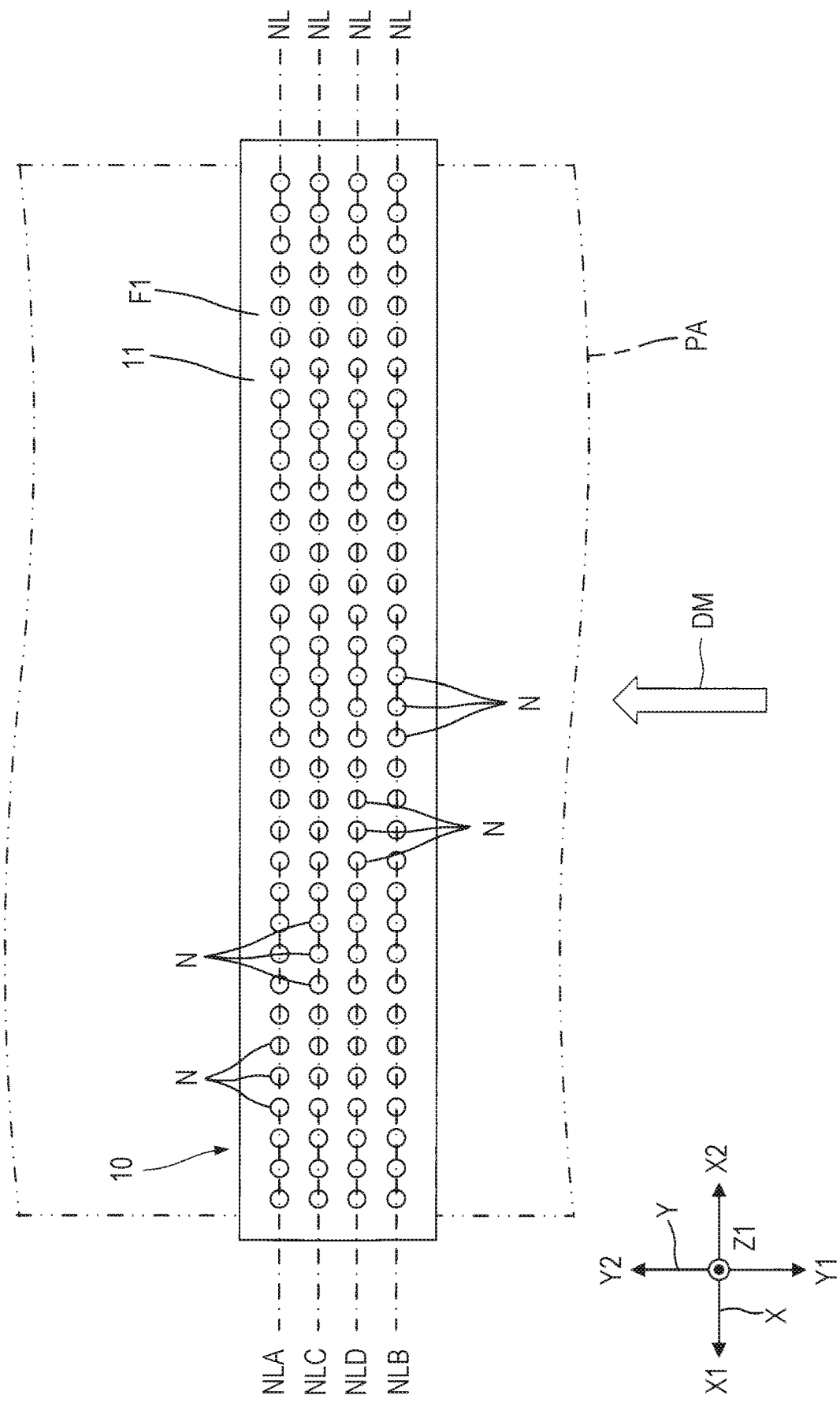
FIG. 3 is a bottom view showing a nozzle plate on which a nozzle row is formed.

FIG. 3 is a bottom view showing a nozzle plate 11 on which a nozzle row NL is formed. The liquid ejecting head 10 includes the nozzle plate 11 having a plurality of nozzle rows NL. The nozzle row NL includes a plurality of nozzles N ejecting an ink. Among surfaces of the nozzle plate 11, a surface facing the medium PA is the ejection surface F1 for ejecting the ink. The plurality of nozzles N are formed in the ejection surface F1. The ejection surface F1 is disposed to be spaced apart from the medium PA.

The plurality of nozzle rows NL include nozzle rows NLA, NLB, NLC, and NLD. The nozzle row NLA includes the plurality of nozzles N ejecting the first ink. The nozzle row NLB includes the plurality of nozzles N ejecting the second ink. The nozzle row NLC includes the plurality of nozzles N ejecting the third ink. The nozzle row NLD includes the plurality of nozzles N ejecting the fourth ink. When not distinguishing between the nozzle rows NLA, NLB, NLC, and NLD, the nozzle rows will be described as the nozzle rows NL in some cases.

The nozzle row NL includes the plurality of nozzles N arranged in the X-axis direction. The nozzle N is a through-hole that penetrates the nozzle plate 11 in a plate thickness direction thereof. The plate thickness direction of the nozzle plate 11 follows the Z-axis direction. The nozzle rows NLA, NLB, NLC, and NLD are disposed at positions different from each other in the Y-axis direction.

The nozzle row NLA, the nozzle row NLC, the nozzle row NLD, and the nozzle row NLB are disposed in this order toward the Y1 direction. The nozzle row NLA, the nozzle row NLC, the nozzle row NLD, and the nozzle row NLB are spaced apart from each other in the Y-axis direction. The nozzle row NLC is disposed between the nozzle row NLA and the nozzle row NLB in the Y-axis direction. The nozzle row NLD is disposed between the nozzle row NLC and the nozzle row NLB in the Y-axis direction.

When viewed in the Y-axis direction, the nozzle row NLA, the nozzle row NLC, the nozzle row NLD, and the nozzle row NLB at least partially overlap each other. In the present embodiment, when viewed in the Y-axis direction, the nozzle row NLA, the nozzle row NLC, the nozzle row NLD, and the nozzle row NLB entirely overlap each other.

As shown in FIG. 1, the liquid ejecting head 10 is held, for example, in an inclined posture with respect to a housing 1a of the liquid ejecting apparatus 1. "The liquid ejecting head 10 is held with respect to the housing 1a of the liquid ejecting apparatus 1" includes both of a case where the liquid ejecting head 10 is held by being directly fixed to the housing 1a and a case where the liquid ejecting head 10 is indirectly held with respect to the housing 1a via a member different from the housing 1a. The liquid ejecting apparatus 1 can hold the liquid ejecting head 10 in the inclined posture in which the ejection surface F1 is inclined with respect to the horizontal plane F0.

Figure 4:
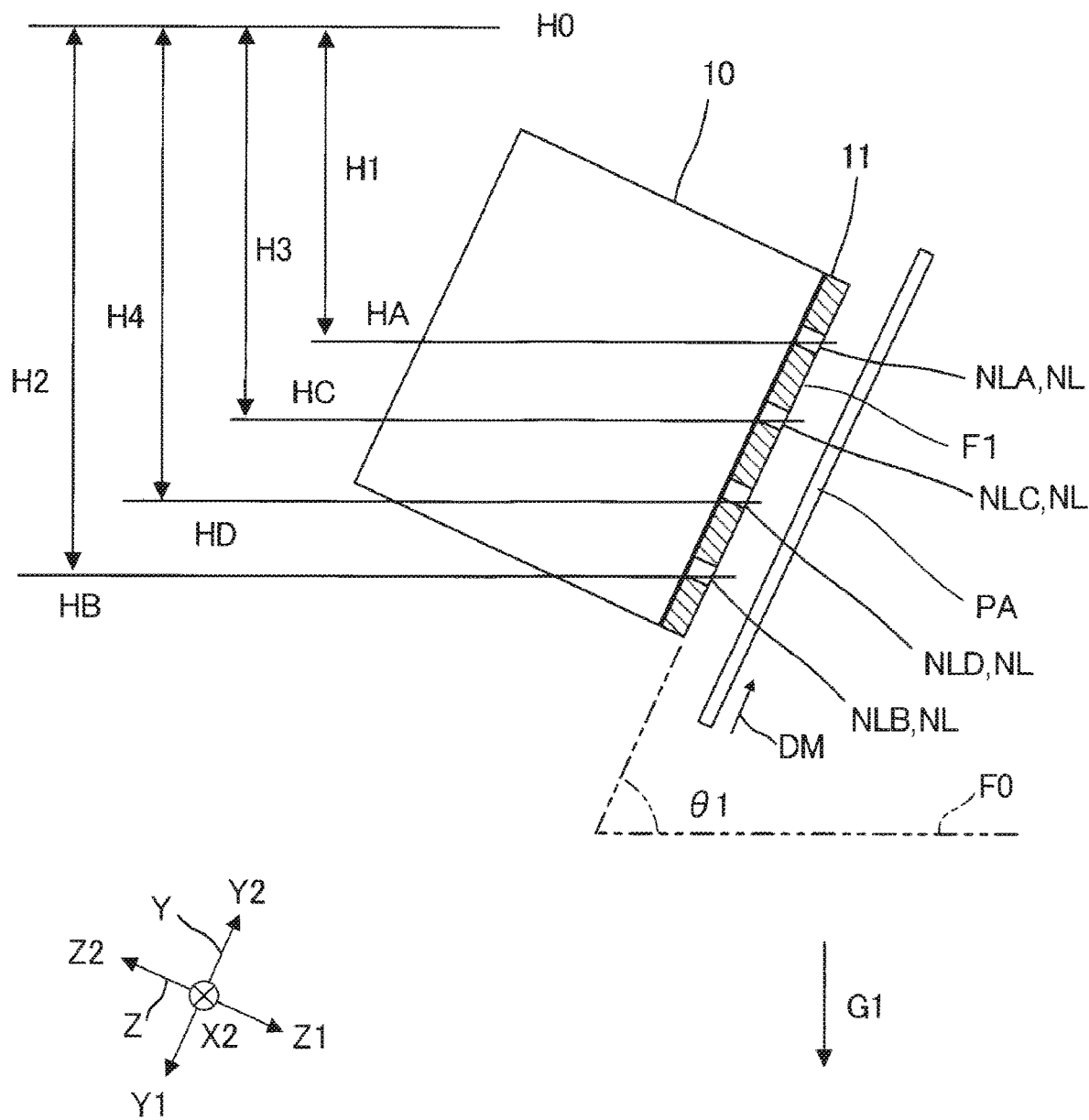
FIG. 4 is a schematic view showing a liquid ejecting head in an inclined posture in which an ejection surface is inclined with respect to a horizontal plane and is a view showing a water head difference of the nozzle row.

FIG. 4 is a schematic view showing the liquid ejecting head 10 in the inclined posture in which the ejection surface F1 is inclined with respect to the horizontal plane F0 and is a view showing water head differences H1 to H4 of the nozzle rows NL. As shown in FIG. 4, the ejection surface F1 of the liquid ejecting head 10 is inclined with respect to the horizontal plane F0 at an inclination angle θ1. The inclination angle θ1 is, for example, an acute angle that is less than 90 degrees. The inclination angle θ1 may be an obtuse angle exceeding 90 degrees. The inclination angle θ1 may be 90 degrees. The inclination referred herein includes 90 degrees. The inclined posture of the liquid ejecting head 10 in which the ejection surface F1 is inclined with respect to the horizontal plane F0 at the inclination angle θ1 is an example of a first posture.

In the inclined posture of the liquid ejecting head 10 shown in FIG. 4, the plurality of nozzle rows NL are disposed at heights different from each other in the gravity direction G1. The nozzle row NLA is disposed at a height position HA, and the nozzle row NLB is disposed at a height position HB. The height position HA is positioned above the height position HB. That is, the nozzle row NLA for ejecting the first ink having a higher dynamic surface tension is positioned above the nozzle row NLB for ejecting the second ink having a lower dynamic surface tension. The nozzle row NLC is disposed at a height position HC. The height position HC is below the height position HA and is above the height position HB. In the inclined posture of the liquid ejecting head 10, the nozzle row NLC is positioned below the nozzle row NLA and above the nozzle row NLB. That is, the nozzle row NLC for ejecting the third ink having the second highest dynamic surface tension, among the first ink, the second ink, and the third ink, is disposed between the nozzle row NLA and the nozzle row NLB in the gravity direction G1.

The nozzle row NLD is disposed at a height position HD. The height position HD is below the height position HC and is above the height position HB. In the inclined posture of the liquid ejecting head 10, the nozzle row NLD is positioned below the nozzle row NLC and above the nozzle row NLB. That is, the nozzle row NLD for ejecting the fourth ink having the second highest dynamic surface tension, among the second ink, the third ink, and the fourth ink, is disposed between the nozzle row NLC and the nozzle row NLB in the gravity direction G1.

As shown in FIG. 4, when viewed in the X-axis direction, the nozzle row NLA, the nozzle row NLC, the nozzle row NLD, and the nozzle row NLB are disposed at intervals from each other.

When comparing the plurality of nozzle rows NL to each other, the nozzle row NL for ejecting an ink having a higher dynamic surface tension is positioned above the nozzle row NL for ejecting an ink having a lower dynamic surface tension.

Figure 5:
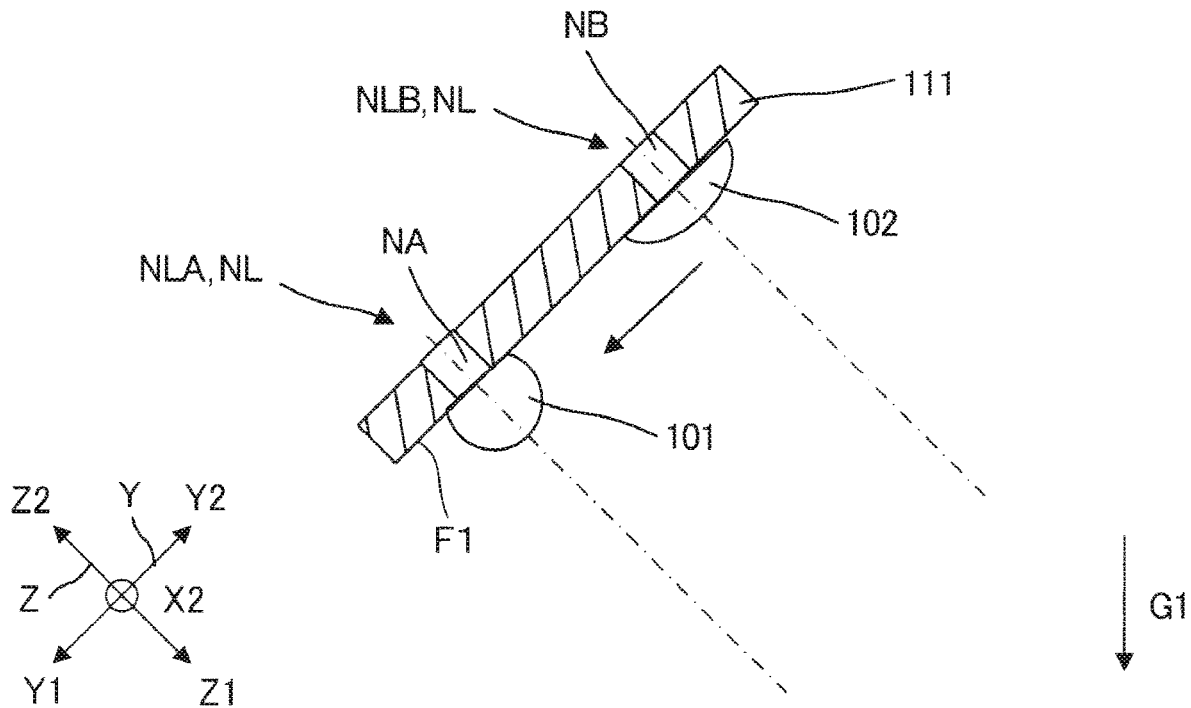
FIG. 5 is a cross-sectional view showing a nozzle plate according to comparative example 1 and is a view showing a state where ink droplets overflow from a nozzle.
Figure 6:
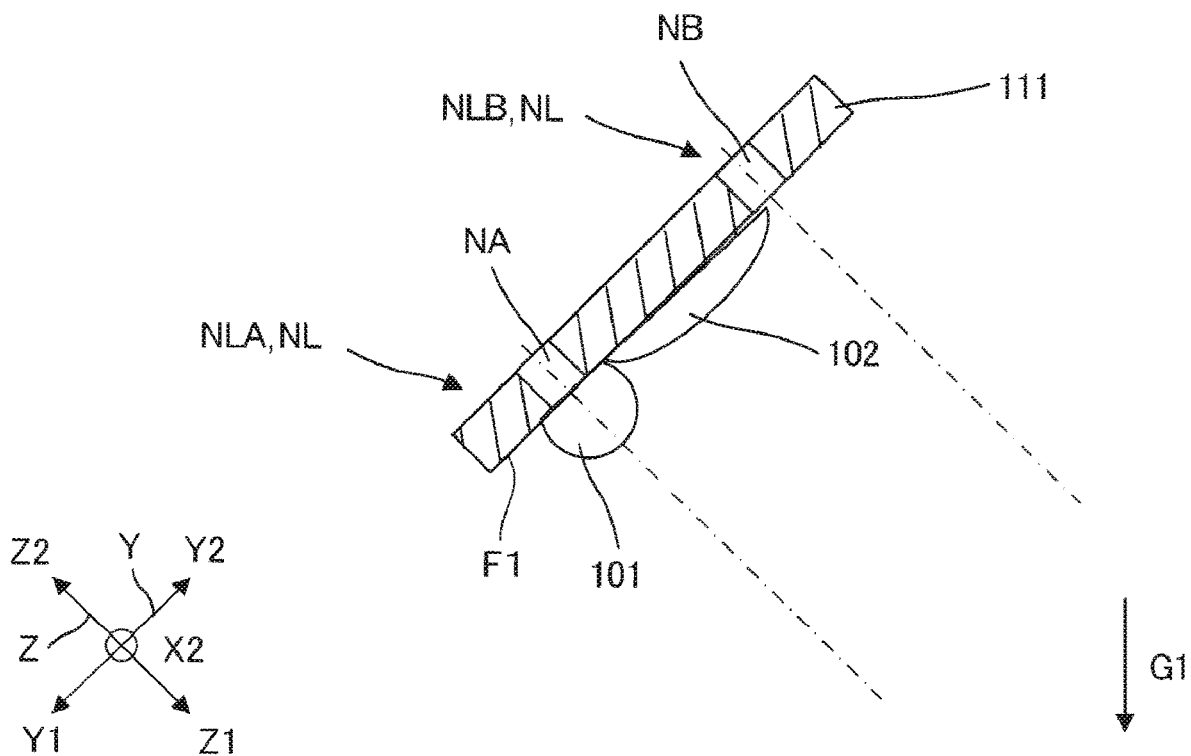
FIG. 6 is a cross-sectional view showing the nozzle plate according to comparative example 1 and is a view showing a state where the ink droplets overflowed from the nozzle drip along the ejection surface.
Figure 7:
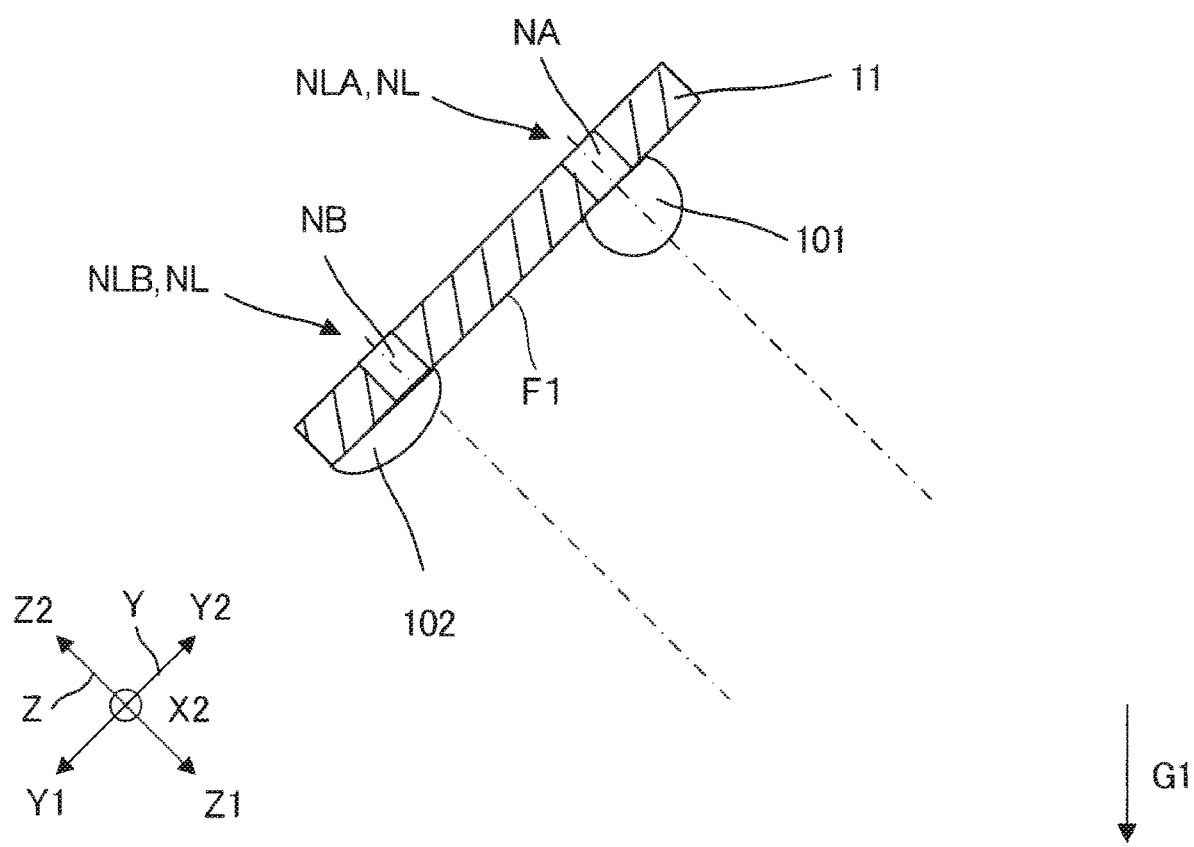
FIG. 7 is a cross-sectional view showing a nozzle plate according to example 1 and is a view showing a state where the ink droplets overflow from the nozzle.

Next, a case where ink droplets 101 and 102 drip along the ejection surface F1 as the meniscus of the nozzle N has a positive pressure due to a factor such as circulation cleaning in which an abnormality occurs in the pressure adjusting portion 8 and an ink is circulated in the flow path in the liquid ejecting head 10 by a circulation mechanism (not shown) will be described with reference to FIGS. 5 to 7. Herein, the nozzle plates 11 and 111 for ejecting two types of inks having dynamic surface tensions different from each other will be described as examples. FIGS. 5 and 6 show the nozzle plate 111 according to comparative example 1, and FIG. 7 shows the nozzle plate 11 according to example 1. In the nozzle plate 111 according to comparative example 1, the nozzle row NLB for ejecting the second ink having a lower dynamic surface tension is positioned above the nozzle row NLA for ejecting the first ink having a higher dynamic surface tension. In the nozzle plate 11 according to example 1, contrary to the case of comparative example 1, the nozzle row NLA for ejecting the first ink is positioned above the nozzle row NLB for ejecting the second ink.

FIG. 5 is a cross-sectional view showing a state where the ink droplets 101 and 102 overflow from the nozzles NA and NB of the nozzle plate 111 according to comparative example 1. In the state shown in FIG. 5, the ink droplet 102, which is the second ink, overflows from the nozzle row NLB above, and the ink droplet 101, which is the first ink, overflows from the nozzle row NLA below.

FIG. 6 is a cross-sectional view showing the nozzle plate 111 according to comparative example 1 and is a view showing a state where the ink droplet 101 overflowed from the nozzle NA drips along the ejection surface F1. In the state shown in FIG. 6, the ink droplet 102 moves in the Y1 direction along the ejection surface F1. The ink droplet 101 overflowed from the nozzle row NLA below is at the front of the nozzle NA. The front of the nozzle NA is outside the nozzle NA and is a position of the nozzle NA in the Z1 direction. The ink droplet 102 having a lower dynamic surface tension is likely to drip lower than the ink droplet 101 having a higher dynamic surface tension due to gravity. The ink droplet 102 moves in the Y1 direction and approaches the ink droplet 101 below. With the passage of time, the ink droplet 102 moves in the Y1 direction and comes into contact with the ink droplet 101. Thus, the ink droplet 102 and the ink droplet 101 are mixed with each other.

In the state, when the first ink is ejected from the nozzle row NLA, the first ink mixed with the second ink lands on the medium PA. For this reason, there is a possibility that printing accuracy decreases.

FIG. 7 is a cross-sectional view showing the nozzle plate 11 according to example 1 and shows a state where the ink droplets 101 and 102 overflow from the nozzles NA and NB. In the state shown in FIG. 7, the ink droplet 102 moves in the Y1 direction along the ejection surface F1. In this case, the ink droplet 101 overflowed from the nozzle row NLA above remains to be at a position at the front of the nozzle NA. The ink droplet 101 above does not approach the nozzle row NLB below. The ink droplet 102 overflowed from the nozzle row NLB below moves downward due to gravity, but the ink droplet 102 does not approach the ink droplet 101. The ink droplet 101 and the ink droplet 102 are not mixed with each other. As described above, since the nozzle row NLA for ejecting the first ink having a higher dynamic surface tension is positioned above the nozzle row NLB in the gravity direction G1, color mixing between the first ink and the second ink can be suppressed in example 1.

In the liquid ejecting head 10 according to the first embodiment shown in FIG. 4, the nozzle rows NLA, NLB, NLC, and NLD are disposed according to the dynamic surface tension of an ink. The nozzle row NLA for ejecting the first ink having the highest dynamic surface tension is disposed at a position higher than the other nozzle rows NLB, NLC, and NLD in the gravity direction G1. As described above, since the nozzle row NLA for ejecting the first ink, which is most unlikely to drip droplets, is disposed at a higher position, the first ink, the other second ink, the third ink, and the fourth ink are prevented from being mixed with each other.

In the liquid ejecting head 10, the nozzle row NLB for ejecting the second ink having the lowest dynamic surface tension is disposed at a position lower than the other nozzle rows NLA, NLC, and NLD in the gravity direction G1. As described above, since the nozzle row NLB for ejecting the second ink, which is most likely to drip droplets, is disposed at a lower position, the second ink, the other first ink, the third ink, and the fourth ink are prevented from being mixed with each other.

As for a plurality of types of inks, since the nozzle row NLA for ejecting the first ink having a higher dynamic surface tension is positioned above the nozzle row NLB for ejecting the second ink having a lower dynamic surface tension in the gravity direction G1, the mixing of the inks is suppressed in the liquid ejecting head 10. As a result, the printing accuracy of the liquid ejecting apparatus 1 can be improved. Compared to the configuration of comparative example 1 in which the nozzle row NLB for ejecting the second ink having a lower dynamic surface tension is disposed at a position higher than the nozzle row NLA for ejecting the first ink having a higher dynamic surface tension, a probability that the plurality of inks can be mixed in the liquid ejecting head 10 is low.

Next, the water head differences H1 to H4 of the nozzle rows NL will be described with reference to FIG. 4. FIG. 4 shows a height position H0 of the pressure adjusting portion 8 in the gravity direction G1. The height position H0 is positioned above the height positions HA, HB, HC, and HD of the nozzle rows NLA, NLB, NLC, and NLD. As described above, the height position HA is disposed at a position higher than the height position HC, HC is disposed at a position higher than the height position HD, and the height position HD is disposed at a position higher than the height position HB. The height position H0 of the pressure adjusting portion 8 is not limited to being above the height positions of the nozzle rows NLA, NLB, NLC, and NLD. The height position H0 of the pressure adjusting portion 8 may be below the height positions of the nozzle rows NLA, NLB, NLC, and NLD. In addition, the height position H0 of the pressure adjusting portion 8 may be a height position between the nozzle row NLA and the nozzle row NLB. In addition, all of the height positions of the plurality of pressure adjusting portions 8A, 8B, 8C, and 8D are the height position H0.

A water head difference H2 between the pressure adjusting portion 8 and the nozzle row NLB is larger than a water head difference H4 between the pressure adjusting portion 8 and the nozzle row NLD. The water head difference H4 between the pressure adjusting portion 8 and the nozzle row NLD is larger than a water head difference H3 between the pressure adjusting portion 8 and the nozzle row NLC. The water head difference H3 between the pressure adjusting portion 8 and the nozzle row NLC is larger than a water head difference H1 between the pressure adjusting portion 8 and the nozzle row NLA.

In the inclined posture of the liquid ejecting head 10 shown in FIG. 4, the water head differences H1, H2, H3, and H4 acting on the nozzle rows NL are different from each other according to a height position. When a water head difference is larger, an ink is more likely to be supplied to the nozzle row NL compared to a case of a smaller water head difference. When comparing the nozzle row NLA and the nozzle row NLB to each other, an ink is more unlikely to be supplied to the nozzle row NLA having a smaller water head difference H1 than the nozzle row NLB having a larger water head difference H2.

In addition, for example, when dynamic surface tensions of a plurality of types of inks are different from each other, a capillary force acting on an ink and a meniscus pressure resistance are different for the nozzle N. A capillary force acting on the first ink having a higher dynamic surface tension is larger than a capillary force acting on the second ink having a lower dynamic surface tension. The meniscus pressure resistance of the first ink having a higher dynamic surface tension is greater than the meniscus pressure resistance of the second ink having a lower dynamic surface tension. The first ink having a higher dynamic surface tension is more easily supplied to the nozzle row NL than the second ink having a lower dynamic surface tension.

That is, since a difference in the dynamic surface tension of an ink affects variations in ease of supplying the ink to the nozzle row NL, by assigning an ink having a different dynamic surface tension according to the height of the nozzle row NL in order to alleviate variations in ease of supplying the ink to the nozzle row NL caused by variations in the water head difference, variations in ease of supplying the ink into the nozzle row NL can be reduced, and as a result, variations in ejection characteristics can be reduced. Examples of the ejection characteristics include a weight Iw and a speed Vm of ejected droplets.

In the liquid ejecting apparatus according to the related art, a relationship of a combination of an effect of different dynamic surface tensions and an effect of the inclined ejection surface F1 of the liquid ejecting head 10 has not been considered. When the fact that a dynamic surface tension is different for each ink and the ejection surface F1 is inclined is not considered, a problem, in which a difference in ejection characteristics of an ink for each nozzle row NL becomes large, occurs.

For example, when each of the pressure adjusting portions 8 corresponding to each of the plurality of nozzle rows NL has the common configuration and when each distance (water head difference) between each nozzle row NL and each pressure adjusting portion 8 corresponding to each nozzle row NL in the gravity direction is equal, a pressure (negative pressure) acting on each nozzle row NL is the same. However, when the liquid ejecting head 10 is inclined, as the plurality of nozzle rows NL are disposed at positions different from each other in the gravity direction, variations in each water head difference occur. Further, there is a difference in the dynamic surface tension of each ink, and there is a possibility that variations occur in a pressure acting on each nozzle row NL.

Then, when the first ink that is easier to be supplied is supplied to the nozzle row NLB to which the first ink is easier to be supplied and the second ink that is more difficult to be supplied is supplied to the nozzle row NLA to which the second ink is more difficult to be supplied, a large difference between the ejection characteristics of the nozzle row NLA and the ejection characteristics of the nozzle row NLB occurs. In addition, in this case, there is also a possibility that bubbles are drawn from the nozzle N as a relatively large negative pressure acts on the meniscus of the nozzle row NLA or a possibility that an ink overflows from the nozzle N and the meniscus is destroyed as a relatively large positive pressure acts on the meniscus of the nozzle row NLB.

In the liquid ejecting head 10 of the present embodiment, the nozzle rows NLA, NLB, NLC, and NLD are disposed according to the dynamic surface tension of an ink. The nozzle row NLA for ejecting the first ink having the highest dynamic surface tension is disposed at a position higher than the other nozzle rows NLB, NLC, and NLD in the gravity direction G1. The first ink that is easier to be supplied is supplied to the nozzle row NLA having a smaller water head difference H1.

In the liquid ejecting head 10, the nozzle row NLB for ejecting the second ink having the lowest dynamic surface tension is disposed at a position lower than the other nozzle rows NLA, NLC, and NLD in the gravity direction G1. The second ink that is more difficult to be supplied is supplied to the nozzle row NLB having a larger water head difference H2.

In the liquid ejecting head 10, as for a plurality of types of inks, since the nozzle row for ejecting the first ink having a higher dynamic surface tension is positioned above the nozzle row for ejecting the second ink having a lower dynamic surface tension in the gravity direction G1, variations in ease of supplying an ink can be reduced, and variations in ejection characteristics of an ink in a plurality of nozzle rows can be suppressed. As a result, the printing accuracy of the liquid ejecting apparatus 1 can be improved.

In addition, in the liquid ejecting apparatus 1, since the plurality of pressure adjusting portions 8 are disposed at the same height position H0 in the gravity direction G1, the liquid ejecting apparatus 1 can be miniaturized, and the structure of the liquid ejecting apparatus 1 can be simplified, compared to a case where the height positions of the plurality of pressure adjusting portions 8 are different from each other. By aligning the height positions H0 of the plurality of pressure adjusting portions 8, the ink flow path can be simplified.

Figure 8:
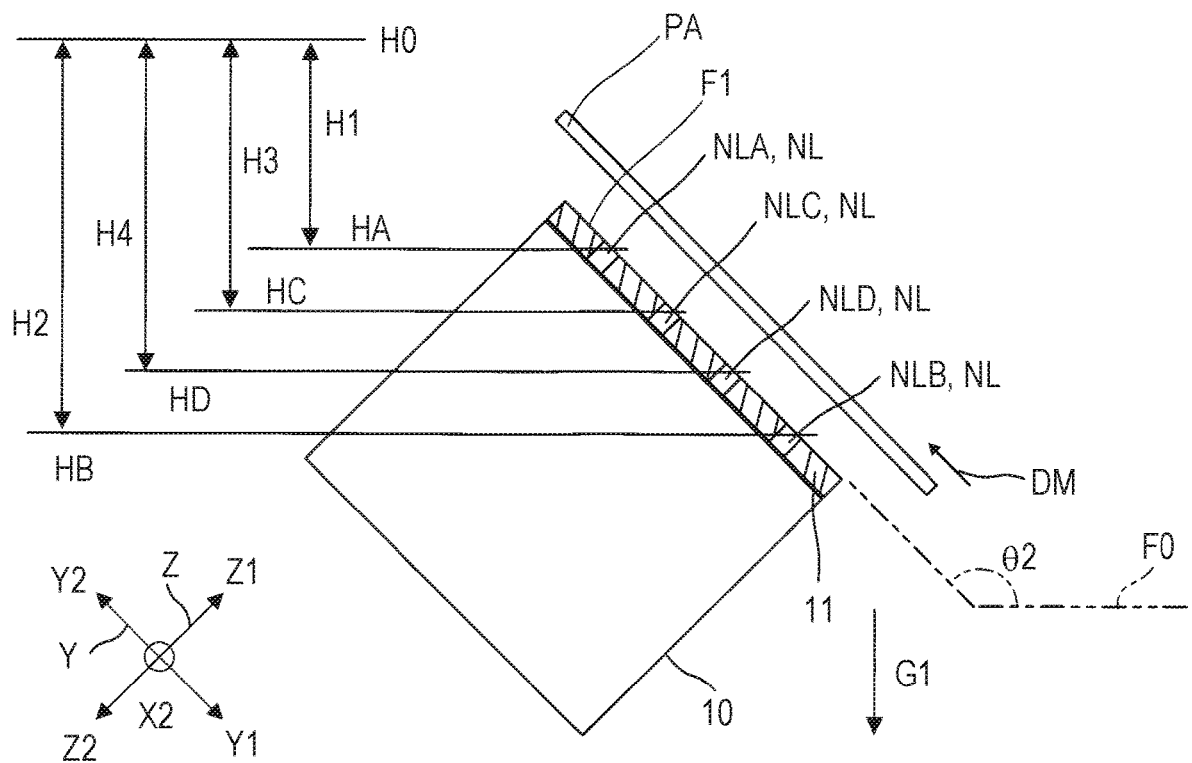
FIG. 8 is a schematic view showing a liquid ejecting head according to example 2 and is a view showing the inclined posture in which the ejection surface is inclined to face obliquely upward.

Next, the inclined posture of the liquid ejecting head 10 according to example 2 will be described with reference to FIG. 8. FIG. 8 is a schematic view showing the liquid ejecting head 10 according to example 2 and is a view showing the inclined posture in which the ejection surface F1 is inclined to face obliquely upward. The liquid ejecting head 10 according to example 2 shown in FIG. 8 is different from the liquid ejecting head 10 of the first embodiment shown in FIG. 4 in that an inclination angle θ2 of the ejection surface F1 is different from the inclination angle θ1.

The inclination angle θ2 is an angle larger than 90 degrees with respect to the horizontal plane F0 and is an obtuse angle. The inclination angle θ2 is a rotation angle counterclockwise shown in the drawing with a rotation shaft along the X-axis direction as a center. In FIG. 8, the ejection surface F1 is inclined to face obliquely upward. Such a liquid ejecting head 10 according to example 2 can achieve the same operational effects as the liquid ejecting head 10 according to the first embodiment, and variations in ejection characteristics of an ink of the plurality of nozzle rows can be suppressed.

Figure 9:
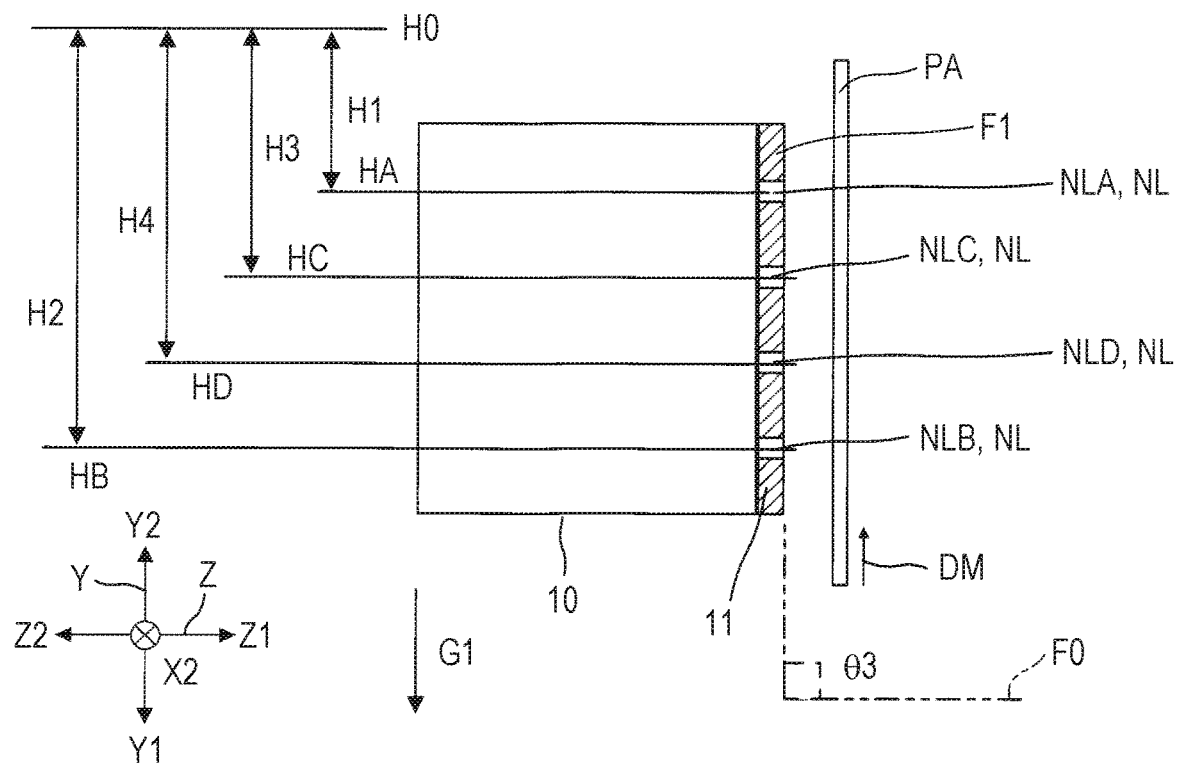
FIG. 9 is a schematic view showing a liquid ejecting head according to example 3 and is a view showing a posture in which the ejection surface is perpendicular to the horizontal plane.

Next, the inclined posture of the liquid ejecting head 10 according to example 3 will be described with reference to FIG. 9. FIG. 9 is a schematic view showing the liquid ejecting head 10 according to example 3 and is a view showing a posture in which the ejection surface F1 is perpendicular to the horizontal plane F0. The liquid ejecting head 10 according to example 3 shown in FIG. 9 is different from the liquid ejecting head 10 of the first embodiment shown in FIG. 4 in that an angle $\theta 3$ of the ejection surface F1 is different from the inclination angle $\theta 1$. The inclined posture of the liquid ejecting head 10 may include a posture perpendicular to the horizontal plane F0. In the present embodiment, a case where the ejection surface F1 is perpendicular to the horizontal plane F0 is referred to as being inclined in some cases. The angle $\theta 3$ forms a right angle with respect to the horizontal plane F0, which is 90 degrees. Such a liquid ejecting head 10 according to example 3 can achieve the same operational effects as the liquid ejecting head 10 according to the first embodiment, and variations in ejection characteristics of an ink of the plurality of nozzle rows can be suppressed by reducing variations in ease of supplying an ink.

Figure 10:
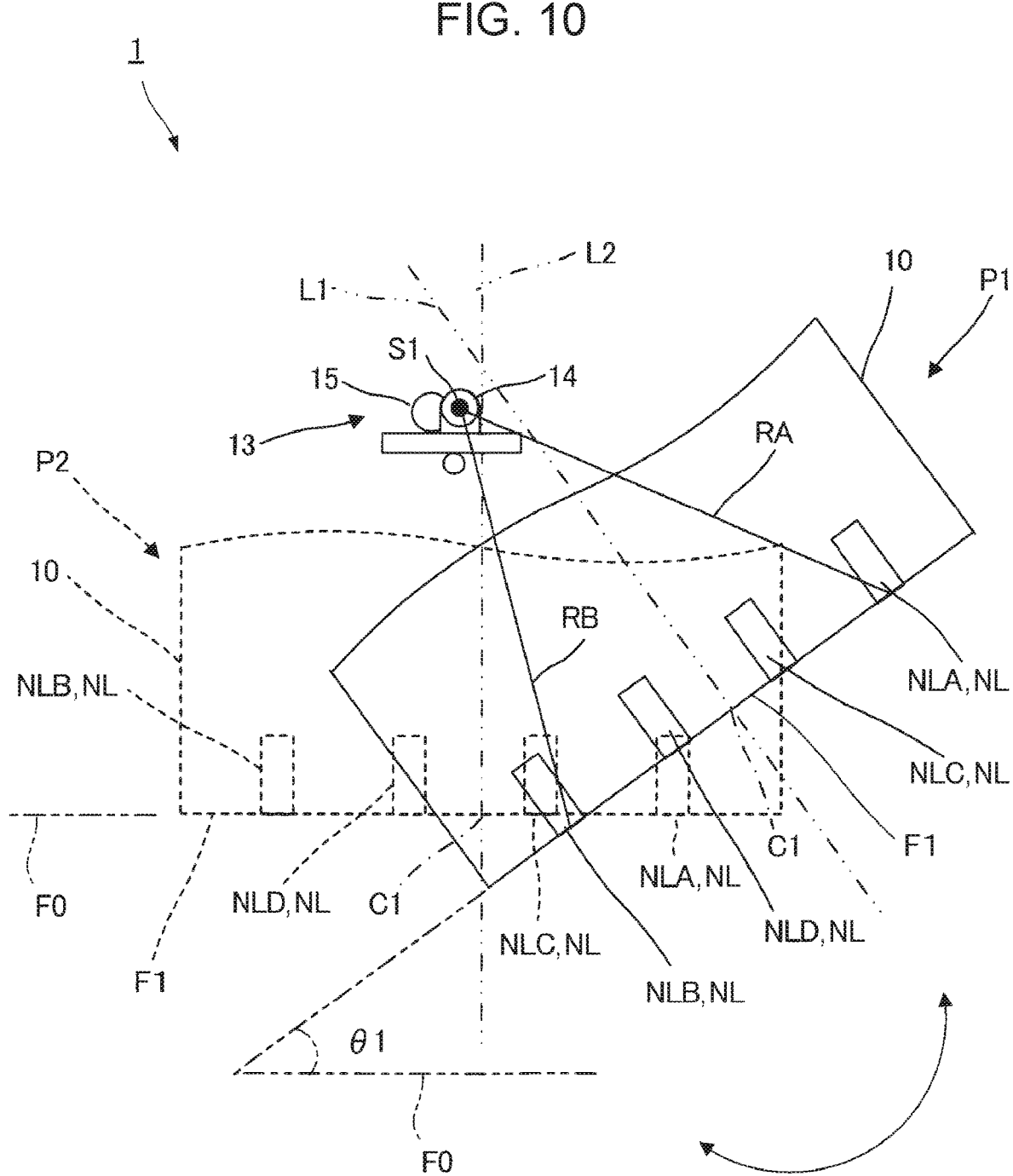
FIG. 10 is a schematic view showing a liquid ejecting apparatus according to example 4.

Next, a posture change of the liquid ejecting head 10 according to example 4 will be described with reference to FIG. 10. FIG. 10 is a schematic view showing the liquid ejecting head 10 according to example 4. In FIG. 10, the liquid ejecting head 10 in a first posture P1 in which the ejection surface F1 is inclined with respect to the horizontal plane F0 is shown by a solid line, and the liquid ejecting head 10 in a second posture P2 in which the ejection surface F1 is disposed along the horizontal plane F0 is shown by a broken line. The liquid ejecting head 10 can rotationally move around a rotation shaft S1 extending in the X-axis direction.

The posture of the liquid ejecting head 10 can be changed to a plurality of postures including the first posture P1 and the second posture P2. The liquid ejecting apparatus 1 according to example 4 has a posture changing mechanism 13 that changes the posture of the liquid ejecting head 10. The posture changing mechanism 13 includes a bearing 14 that holds the rotation shaft S1 extending in the X-axis direction and a drive mechanism 15 that rotates the rotation shaft S1. The bearing 14 rotatably supports the rotation shaft S1. The drive mechanism 15 includes, for example, a motor.

In FIG. 10, imaginary lines L1 and L2 are shown by two-dot chain lines. The imaginary line L1 is an imaginary straight line that passes through a center C1 between the nozzle row NLA and the nozzle row NLB and that extends in a direction perpendicular to the ejection surface F1 in the first posture P1. The imaginary line L1 extends in the Z-axis direction when viewed in the X-axis direction. When the liquid ejecting head 10 is in the first posture P1, the rotation shaft S1 is positioned closer to the nozzle row NLB when viewed from the imaginary line L1. In other words, when the liquid ejecting head 10 is in the first posture P1, the rotation shaft S1 is positioned closer to the nozzle row NLB than the imaginary line L1 is in the Y-axis direction.

The imaginary line L2 is an imaginary straight line that passes through the center C1 between the nozzle row NLA and the nozzle row NLB and that extends in the direction perpendicular to the ejection surface F1 in the second posture P2. The imaginary line L2 extends in the Z-axis direction when viewed in the X-axis direction. In FIG. 10, arrows indicating the X-axis direction, the Y-axis direction, and the Z-axis direction in the second posture P2 are shown by broken lines. The first posture P1 and the second posture P2 are shifted from each other by the inclination angle $\theta 1$ when viewed in the X-axis direction. When the liquid ejecting head 10 is in the second posture P2, the rotation shaft S1 is positioned closer to the nozzle row NLB when viewed from the imaginary line L2. In other words, when the liquid ejecting head 10 is in the second posture P2, the rotation shaft S1 is positioned closer to the nozzle row NLB than the imaginary line L2 is in the Y-axis direction.

In the first posture P1 and the second posture P2, the rotation shaft S1 may be at the same position or may be at different positions. In the posture change of the liquid ejecting head 10 from the first posture P1 to the second posture P2, the liquid ejecting head 10 may include a linear movement. The liquid ejecting apparatus 1 can linearly move the bearing 14 that holds the rotation shaft S1. For example, the liquid ejecting apparatus can linearly move the bearing with a rack and pinion. The liquid ejecting head 10 can be linearly moved using other ball screws, guide grooves, actuators, and belt mechanisms.

Next, a centrifugal force acting on a meniscus during the rotational movement of the liquid ejecting head 10 will be described. When the liquid ejecting head 10 rotationally moves around the rotation shaft S1, a centrifugal force acts on menisci in the plurality of nozzle rows NL. Radius of gyration RA from the rotation shaft S1 to the nozzle row NLA is larger than radius of gyration RB from the rotation shaft S1 to the nozzle row NLB. During the rotational movement of the liquid ejecting head 10, the magnitude of a centrifugal force acting on the meniscus of the nozzle row NLA and the magnitude of a centrifugal force acting on the meniscus of the nozzle row NLB are different from each other. During the rotational movement of the liquid ejecting head 10, the magnitude of the centrifugal force acting on the meniscus of the nozzle row NLA is greater than the magnitude of the centrifugal force acting on the meniscus of the nozzle row NLB.

A centrifugal force that acts immediately after the start of the rotational movement of the liquid ejecting head 10 acts such that a meniscus in the nozzle N is moved toward the outside of the nozzle. In other words, the centrifugal force acts to move the meniscus in a direction separating away from the rotation shaft S1. In addition, an inertial force caused by the centrifugal force acts on a meniscus obtained by moving the meniscus in the nozzle N toward the outside of the nozzle with the centrifugal force. The inertial force caused by the centrifugal force is a force that moves the meniscus in the nozzle N. In other words, the inertial force caused by the centrifugal force is a force acting on the meniscus in a direction approaching the rotation shaft S1. There is a possibility that the meniscus jumps out of the nozzle N or the meniscus is dented and bubbles in the nozzle N are drawn because of such a centrifugal force and the inertial force caused by the centrifugal force.

When the dynamic surface tension of an ink is the same, the nozzle row NLA having a larger centrifugal force has a higher probability that the meniscus disintegrates than the nozzle row NLB having a smaller centrifugal force. In the liquid ejecting head 10, the first ink having a higher dynamic surface tension is supplied to the nozzle row NLA, and the second ink having a lower dynamic surface tension is supplied to the nozzle row NLB. The first ink is supplied to the nozzle row NLA having a larger centrifugal force, and the second ink is supplied to the nozzle row NLB having a smaller centrifugal force. Accordingly, since the first ink having a higher dynamic surface tension is supplied to a nozzle having a larger centrifugal force, the disintegration of a meniscus can be suppressed.

In the liquid ejecting head 10, among a plurality of types of inks, an ink having a higher dynamic surface tension is supplied to the nozzle row NL having a larger centrifugal force, and an ink having a lower dynamic surface tension is supplied to the nozzle row NL having a smaller centrifugal force. Accordingly, the disintegration of a meniscus of an ink in the nozzle N is suppressed.

In the liquid ejecting head 10, by suppressing the disintegration of a meniscus, the entry of bubbles into the nozzle N of the nozzle row NLA is suppressed, or the leakage of an ink from the nozzle N of the nozzle row NLA is suppressed.

The liquid ejecting head 10 according to example 4 includes the plurality of nozzle rows NL, each of which extends in the X-axis direction, but may include the nozzle row NL extending in a direction intersecting an X-axis in plan view of the ejection surface F1 toward the Z-axis direction. In this case, radius of gyration from the rotation shaft S1 to the nozzle row NL may be a distance between the nozzle N that is most separated from the rotation shaft S1, among the plurality of nozzles N configuring the nozzle row NL, and the rotation shaft S1 when viewed in the X-axis direction.

Figure 11:
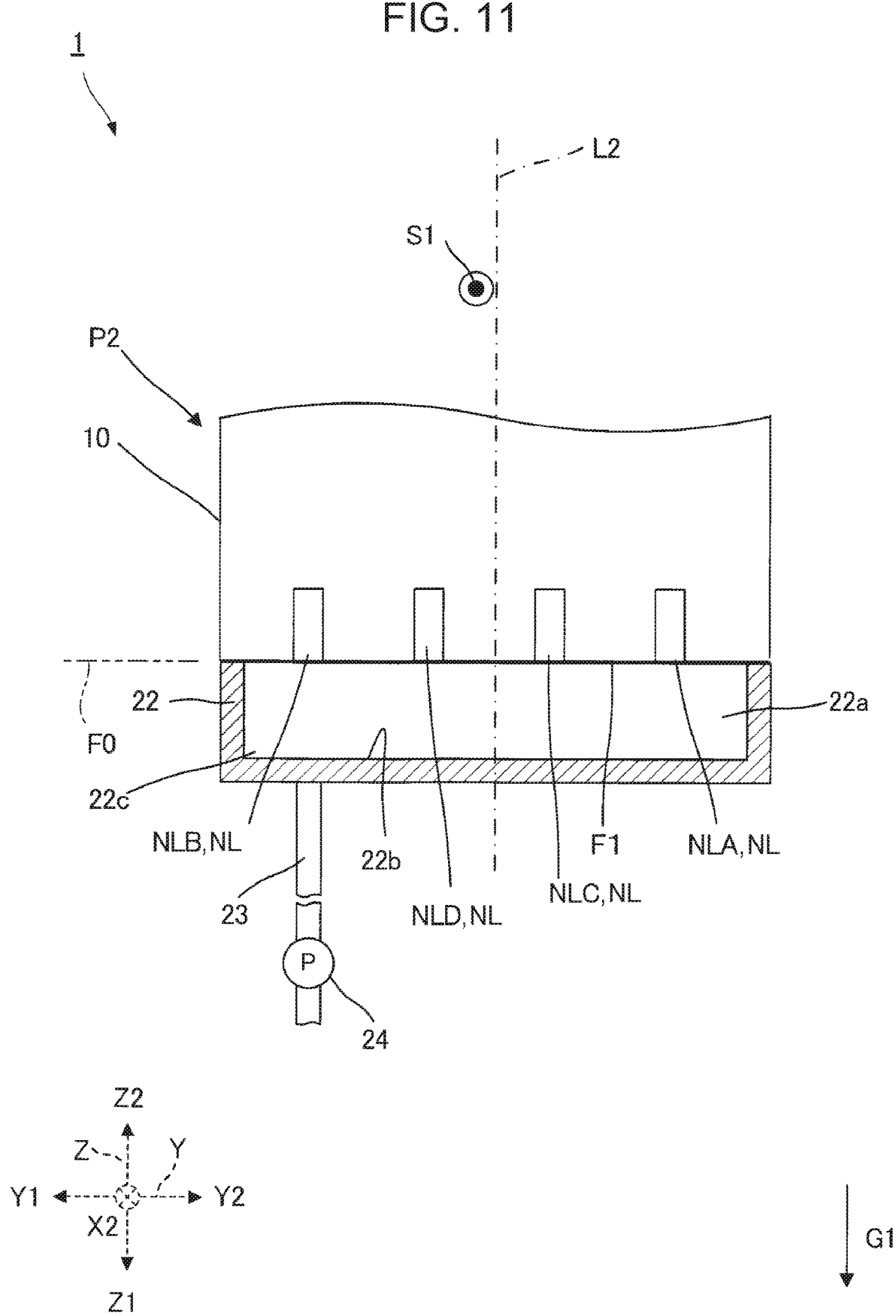
FIG. 11 is a schematic view showing a liquid ejecting apparatus according to example 5.

Next, the liquid ejecting head 10 according to example 5 will be described with reference to FIG. 11. FIG. 11 is a schematic view showing a cap 22 covering the liquid ejecting head 10 of the liquid ejecting apparatus 1 according to example 5 and the ejection surface F1 of the liquid ejecting head 10. The liquid ejecting apparatus 1 can perform a maintenance operation. The liquid ejecting apparatus 1 performs the maintenance operation in the second posture P2 of the liquid ejecting head 10. The liquid ejecting apparatus 1 performs a printing operation (recording operation) in the first posture P1 shown in FIG. 10 and performs the maintenance operation in the second posture P2 shown in FIG. 11. That is, the first posture P1 is an example of a "recording posture", and the second posture P2 is an example of a "maintenance posture". The printing operation is an example of the recording operation. The "recording operation" means discharging an ink from the nozzle N, attaching the ink to a medium, and recording text and an image.

The liquid ejecting apparatus 1 includes the cap 22, a pipe 23, and a pump 24 used in a maintenance operation. The cap 22 covers the ejection surface F1 of the liquid ejecting head 10. The cap 22 is disposed to cover openings of the nozzles N of the plurality of nozzle rows NL. A space 22a receiving an ink discharged from the nozzles N is formed in the cap 22.

The pipe 23 is coupled to the cap 22. The pipe 23 is a pipe through which an ink in the space 22a of the cap 22 is discharged. The pump 24 is coupled to the pipe 23. By driving the pump 24, an ink in the cap 22 can be sucked and discharged to the outside of the cap 22.

The maintenance operation of the liquid ejecting apparatus 1 includes flushing processing, suction cleaning, and pressurization cleaning processing. The maintenance operations are performed in the second posture P2 of the liquid ejecting head 10. In the flushing processing, an ink that does not contribute to the recording operation is discharged from the nozzle N as pressure fluctuations act on a pressure chamber that communicates with the nozzle N using an actuator of the liquid ejecting head 10. In the suction cleaning processing, for example, an ink is sucked from the nozzle N using the pump 24. In addition, in the pressurization cleaning processing, an ink may be discharged from the nozzle N by pressurizing the ink flow path in the liquid ejecting head 10 upstream from the pressure chamber using a pump (not shown).

As described above, in the liquid ejecting apparatus 1, an unnecessary ink in the nozzle N can be discharged to the outside of the liquid ejecting head 10 by performing maintenance processing. In the second posture P2 of the liquid ejecting head 10, the ejection surface F1 is parallel to the horizontal plane F0. Since a maintenance operation can be performed in the second posture P2 in the liquid ejecting apparatus 1, the remaining amount of an ink in the cap 22 can be reduced at a time of air suction in which the pump 24 is driven in a state where a space in the cap 22 communicates with the atmosphere. For example, when the liquid ejecting head 10 is in the first posture P1, an ink remains in a corner portion 22c in the cap 22 since the cap 22 is inclined. On the other hand, in the present example, since the maintenance operation is performed in a state of being disposed along the horizontal plane F0, a bottom surface 22b of the cap 22 can reduce the amount of an ink remaining in the cap 22. When the maintenance operation is performed in the inclined posture, there is a risk that ink leakage from a sealed portion during capping occurs. The sealed portion during capping includes a portion where the cap 22 and the ejection surface F1 are in contact with each other.

In the liquid ejecting apparatus 1, the posture of the liquid ejecting head 10 can be changed from the first posture P1 to the second posture P2. As described above, when the liquid ejecting head 10 rotationally moves around the rotation shaft S1, there is a possibility that a centrifugal force and an inertial force caused by the centrifugal force act on the meniscus of an ink in the nozzle row NL and the meniscus disintegrates. Since among a plurality of types of inks, the first ink having the highest dynamic surface tension is supplied to the nozzle row NLA which has the largest centrifugal force and the largest inertial force caused by the centrifugal force, a probability that a meniscus disintegrates is reduced in the liquid ejecting apparatus 1. By suppressing the disintegration of the meniscus, the entry of bubbles into the nozzle N of the liquid ejecting head 10 is suppressed, or the leakage of an ink from the nozzle N of the nozzle row NLA is suppressed.

Next, the liquid ejecting apparatus 1 according to example 6 will be described with reference to FIG. 12. In example 6, when the liquid ejecting apparatus 1 is mounted on a floor surface 26, an effect of a centrifugal force acting on the nozzle row NL of the liquid ejecting head 10 will be described. The liquid ejecting head 10 of the liquid ejecting apparatus 1 is disposed to be inclined with respect to the horizontal plane F0. The liquid ejecting apparatus 1 includes the housing 1a accommodating the liquid ejecting head 10. The liquid ejecting head 10 is held with respect to the housing 1a. Leg portions 1c and 1d are provided at a bottom portion of the housing 1a. The leg portions 1c and 1d are disposed on the floor surface 26. The floor surface 26 follows, for example, the horizontal plane F0.

Figure 12:
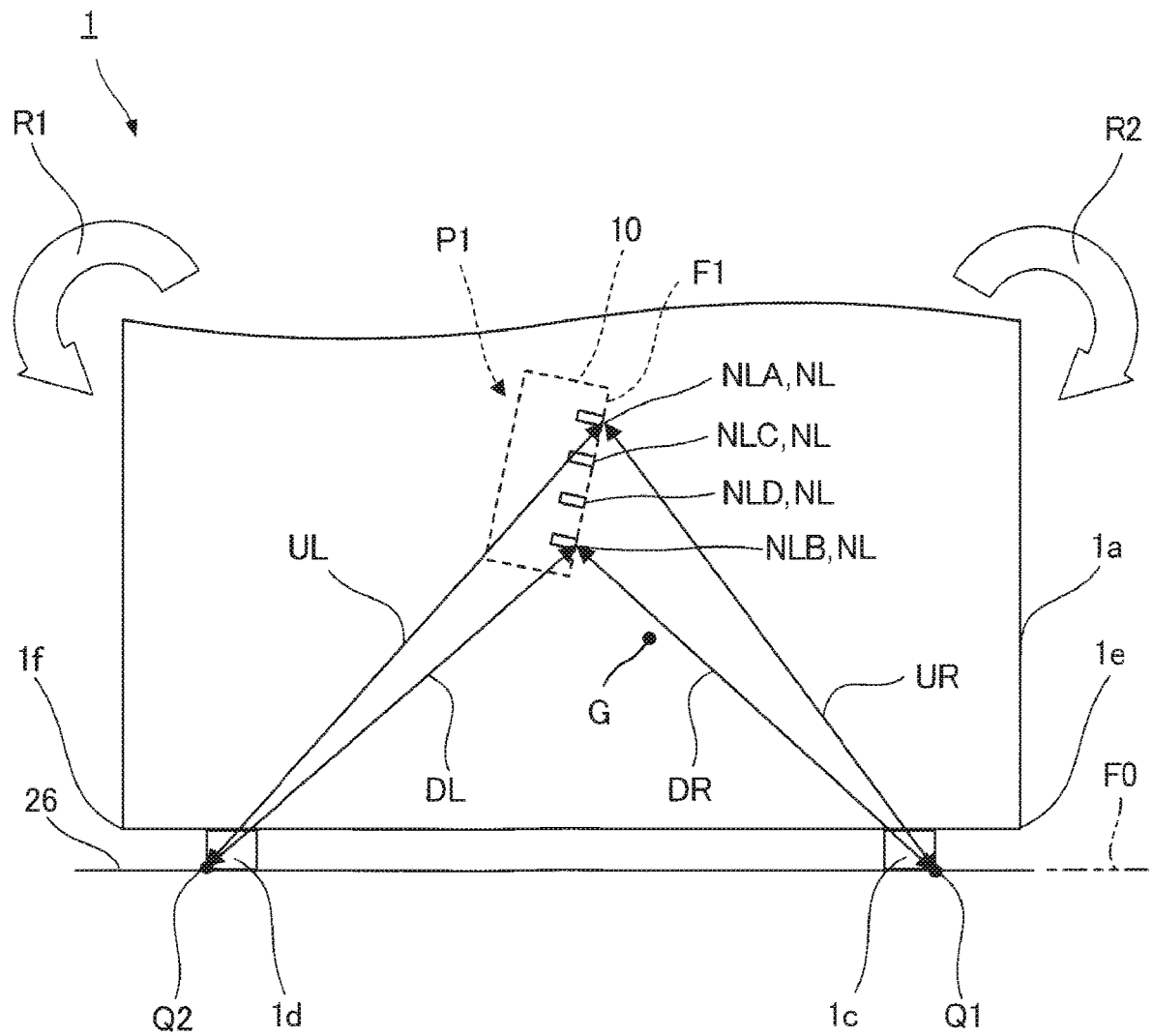
FIG. 12 is a schematic view showing a liquid ejecting apparatus according to example 6.

In FIG. 12, the K-axis direction orthogonal to the gravity direction G1 is shown by an arrow when viewed in the X-axis direction. The K-axis direction follows a right-left direction in FIG. 12. The leg portions 1c and 1d are spaced apart from each other in the K-axis direction. For example, the K-axis direction follows a longitudinal direction of the housing 1a when the liquid ejecting apparatus 1 is viewed in the gravity direction G1. The leg portions 1c and 1d may be spaced apart from each other in other directions.

The leg portion 1c includes a contact point Q1, and the leg portion 1d includes a contact point Q2. The contact point Q1 is an example of a first contact point, and the contact point Q2 is an example of a second contact point. The contact points Q1 and Q2 are portions in contact with the floor surface 26 in a state where the housing 1a is mounted on the floor surface 26. The contact point Q1 is positioned closer to one end 1e of the housing 1a in the K-axis direction. The contact point Q2 is positioned closer to the other end 1f of the housing 1a in the K-axis direction. The one end 1e of the housing 1a is an end portion of the housing 1a in the K1 direction. The other end 1f of the housing 1a is an end portion in the K2 direction.

A center of gravity G of the liquid ejecting apparatus 1 is between the contact point Q1 and the contact point Q2 in the K-axis direction and is positioned closer to the contact point Q1 than to the contact point Q2. When viewed in the X-axis direction, a distance UR between the contact point Q1 and the nozzle row NLA is larger than a distance DR between the contact point Q1 and the nozzle row NLB. When viewed in the X-axis direction, a distance UL between the contact point Q2 and the nozzle row NLA is larger than a distance DL between the contact point Q2 and the nozzle row NLB. The position of the nozzle row NL is, for example, a center position of the opening of the nozzle N in the ejection surface F1.

In the first posture P1 of the liquid ejecting head 10 shown in FIG. 12, the distance UR is larger than the distance DL. In the first posture of the liquid ejecting head 10, the distance UL is larger than the distance DR.

For example, when the liquid ejecting apparatus 1 is moved, it is assumed that a plurality of operators hold and move the liquid ejecting apparatus 1 and finally mount the liquid ejecting apparatus 1 on the floor surface 26. For example, two operators separated from each other in the K-axis direction can hold the liquid ejecting apparatus 1 from both sides. When mounting the liquid ejecting apparatus 1 on the floor surface 26, one operator closer to the one end 1e first brings the leg portion 1c into contact with the floor surface 26, and then the other operator closer to the other end 1f brings the leg portion 1d into contact with the floor surface 26. In a case where the leg portion 1c is brought into contact with the floor surface 26 first, the liquid ejecting apparatus 1 rotationally moves counterclockwise R1 when viewed in the X-axis direction with the contact point Q1 as a fulcrum. In this case, since the distance UR is longer than the distance DR, a centrifugal force that is larger than a centrifugal force acting on the nozzle row NLB acts on the nozzle row NLA.

As described above, when mounting the liquid ejecting apparatus 1 on the floor surface 26, a centrifugal force and an inertial force caused by the centrifugal force, which have different magnitudes according to the distances UR and DR from the contact point Q1, are generated in the nozzle rows NLA and NLB. In the liquid ejecting apparatus 1, the first ink is supplied to the nozzle row NLA, and the second ink is supplied to the nozzle row NLB. The first ink having a higher dynamic surface tension is supplied to the nozzle row NLA having a larger centrifugal force and a larger inertial force, and the second ink having a lower dynamic surface tension is supplied to the nozzle row NLB having a smaller centrifugal force and a smaller inertial force. Accordingly, a probability of the disintegration of the meniscus of the first ink in the nozzle row NLA can be reduced in the liquid ejecting head 10. That is, compared to a case where the second ink is supplied to the nozzle row NLA, a case where the first ink is supplied to the nozzle row NLA has a low probability of the disintegration of the meniscus.

In the case of the liquid ejecting apparatus 1, since the center of gravity G of the liquid ejecting apparatus 1 is positioned closer to the leg portion 1c than the leg portion 1d in the K-axis direction, there is a high probability that the operator first brings the leg portion 1c into contact with the floor surface 26 before the leg portion 1d. Since the first ink is supplied to the nozzle row NLA as described above, a probability of the disintegration of the meniscus in the nozzle N of the nozzle row NLA is reduced in the liquid ejecting apparatus 1.

Next, a case where the liquid ejecting apparatus 1 is disposed such that the leg portion 1d is first brought into contact with the floor surface 26 before the leg portion 1c will be described. In a case where the leg portion 1d is brought into contact with the floor surface 26 first, the liquid ejecting apparatus 1 rotationally moves clockwise R2 when viewed in the X-axis direction with the contact point Q2 as a fulcrum. In this case, since the distance UL is longer than the distance DL, a centrifugal force, which is larger than a centrifugal force acting on the nozzle row NLB, and an inertial force caused by the centrifugal force act on the nozzle row NLA. As described above, when mounting the liquid ejecting apparatus 1 on the floor surface 26, a centrifugal force and an inertial force caused by the centrifugal force, which have different magnitudes according to the distances UL and DL from the contact point Q2, are generated in the nozzle rows NLA and NLB. In the liquid ejecting head 10, the first ink having a higher dynamic surface tension is supplied to the nozzle row NLA having a larger centrifugal force and a larger inertial force caused by the centrifugal force, and the second ink having a lower dynamic surface tension is supplied to the nozzle row NLB having a smaller centrifugal force and a smaller inertial force caused by the centrifugal force. Accordingly, a probability of the disintegration of the meniscus of the first ink in the nozzle row NLA can be reduced in the liquid ejecting head 10. That is, compared to a case where the second ink is supplied to the nozzle row NLA, a case where the first ink is supplied to the nozzle row NLA has a low probability of the disintegration of the meniscus.

For example, in plan view of the liquid ejecting apparatus 1 in the gravity direction G1, a length along the K-axis direction is larger than a length along the X-axis direction. When such a liquid ejecting apparatus 1 is moved, it is easy for the plurality of operators to strike a balance by holding the liquid ejecting apparatus 1 while being separated away in the K-axis direction rather than holding the liquid ejecting apparatus 1 while being separated away in the X-axis direction. Since the first ink is assigned to the nozzle row NLA, the disintegration of the meniscus can be suppressed in the liquid ejecting head 10 compared to a case where the second ink is assigned to the nozzle row NLA. In the liquid ejecting apparatus 1, the leg portion 1c may be lowered first, or the leg portion 1d may be lowered first.

When moving the liquid ejecting apparatus 1, the plurality of operators may hold the liquid ejecting apparatus 1 while being separated away in the X-axis direction. Since the nozzle row NLA is positioned above the nozzle row NLB in the gravity direction G1, among contact points between the housing 1a and the floor surface 26, a distance between a contact point positioned most in the X1 direction and the nozzle row NLA is longer than a distance between the contact point and the nozzle row NLB.

Similarly, among contact points between the housing 1a and the floor surface 26, a distance between a contact point positioned most in the X2 direction and the nozzle row NLA is longer than a distance between the contact point and the nozzle row NLB. Therefore, since the first ink is assigned to the nozzle row NLA regardless of a case of lowering the end portion of the housing 1a in the X1 direction first or a case of lowering the end portion of the housing 1a in the X2 direction first, the disintegration of the meniscus can be suppressed.

The liquid ejecting head 10 according to example 6 includes the plurality of nozzle rows NL, each of which extends in the X-axis direction, but may include the nozzle row NL extending in the direction intersecting the X-axis in plan view of the ejection surface F1 toward the Z-axis direction. In this case, a distance from a contact point to the nozzle row NL may be a distance between the contact point and the nozzle N that is most separated from the contact point viewed in the X-axis direction, among the plurality of nozzles N configuring the nozzle row NL.

Next, a measuring method of a dynamic surface tension of an ink and properties of the ink will be described. The dynamic surface tension of an ink can be acquired, for example, through a maximum bubble pressure method. The measuring method of a dynamic surface tension may be other measuring methods, and examples thereof include a suspension method, a Wilhelmy method, and an annular method. In the maximum bubble pressure method, a tip of a thin tube is immersed with an ink, and a maximum pressure required to release bubbles from the thin tube is measured. In the maximum bubble pressure method, bubbles are continuously generated at the tip of the thin tube, and the maximum pressure is measured.

In the maximum bubble pressure method, when measuring the maximum pressure, a time from a time point when new bubbles are generated at the tip of the thin tube to a time point when the maximum bubble pressure is reached is defined as a lifetime. The maximum bubble pressure is reached at a time point when the radius of curvature of a bubble and the radius of the thin tube are equal to each other. The dynamic surface tension of an ink is a surface tension of the ink in a state where the ink is in motion. The dynamic surface tension of the ink can be adjusted, for example, by changing the type and content of a surfactant, a water-soluble organic solvent, and a resin included in the ink.

Hereinafter, although properties of an ink will be described, "part" and "%" regarding the amount of components are based on mass unless specified otherwise. FIG. 13 is a table showing components of an ink.

A pigment dispersion liquid 1 will be described. A solution obtained by dissolving 5.0 g of concentrated hydrochloric acid in 5.5 g of water was brought into a cooled state of 5° C., and 1.6 g of 4-aminophthalic acid was added to the solution in this state. A container containing this solution was placed in an ice bath and was stirred to maintain the temperature of the solution at 10° C. or lower, and a solution obtained by dissolving 1.8 g of sodium nitrite in 9.0 g of ion-exchanged water at 5° ° C. was added. After stirring the solution for 15 minutes, 6.0 g of pigment was added while being stirred, and the solution was further stirred for 15 minutes to obtain slurry. The pigment added while being stirred was carbon black having a specific surface area of 220 m2/g and a DBP oil absorption of 105 mL/100 g. The obtained slurry was filtered through filter paper, and particles were sufficiently washed with water and were dried in an oven at 110° ° C. Advantech's product name "standard filter paper No. 2" was used as the filter paper. After substituting counter ions from sodium ions to potassium ions through the ion exchange method, an appropriate amount of ion-exchanged water was added to adjust a pigment content, and the pigment dispersion liquid 1 having a pigment content of 20.0% was obtained. The pigment dispersion liquid 1 was used in preparing the first ink having a black hue.

A pigment dispersion liquid 2 will be described. A styrene-ethyl acrylate-acrylic acid copolymer (resin dispersant) having an acid value of 150 mgKOH/g and a weight average molecular weight of 8,000 was prepared. The prepared resin dispersant was neutralized with potassium hydroxide equimolar to the acid value and was dissolved in ion-exchanged water to prepare an aqueous solution of the resin dispersant having a resin (solid content) content of 20.0%. A mixture was obtained by mixing 20.0 parts of pigment (C.I. Pigment Blue 15:3), 30.0 parts of the aqueous solution of the resin dispersant, and 50.0 parts of the ion-exchanged water with each other.

The obtained mixture and 200 parts of zirconia beads having a diameter of 0.3 mm were placed in a batch type vertical sand mill (manufactured by Aimex), were dispersed for 5 hours while cooling with water, and then were centrifuged to remove coarse particles. After pressure-filtration with a microfilter (manufactured by Fujifilm) having a pore size of 3.0 μm, an appropriate amount of ion-exchanged water was added to obtain the pigment dispersion liquid 2. The pigment content of the obtained pigment dispersion liquid 2 was 20.0%, and a resin dispersant content was 6.0%. The pigment dispersion liquid 2 was used in preparing the second ink having a cyan hue.

A pigment dispersion liquid 3 will be described. The pigment dispersion liquid 3 having a pigment content of 20.0% and a resin dispersant content of 6.0% was obtained under the same procedures as in the pigment dispersion liquid 2 described above, except for changing the pigment to C.I. Pigment Yellow 74. The pigment dispersion liquid 3 was used in preparing the third ink having a yellow hue.

A pigment dispersion liquid 4 will be described. The pigment dispersion liquid 4 having a pigment content of 20.0% and a resin dispersant content of 4.0% was obtained under the same procedures as in the pigment dispersion liquid 2 described above, except for changing to 20.0 parts of pigment (C.I. Pigment Magenta 122), 20.0 parts of the aqueous solution of the resin dispersant, and 60.0 parts of the ion-exchanged water. The pigment dispersion liquid 4 was used in preparing the fourth ink having a magenta hue.

The adjustment of an ink will be described. After each component (unit: %) indicating the state of table 1 was mixed and sufficiently stirred, pressure-filtration with a cellulose acetate filter (manufactured by Advantech) having a pore size of 0.8 μm was performed, and each ink was prepared. In table 1, "Acetylenol E100" and "Acetylenol E60" are product names of surfactants manufactured by Kawaken Fine Chemicals. The lower part of table 1 shows a dynamic surface tension y at a lifetime of 10 ms. The dynamic surface tension y was measured using a dynamic surface tensiometer based on the maximum bubble pressure method under the condition of 25° C. "BUBBLE PRESSURE TENSIOMETER BP-2", which is a product name of a dynamic surface tensiometer manufactured by KRUSS, was used as the dynamic surface tensiometer.

Figure 14:
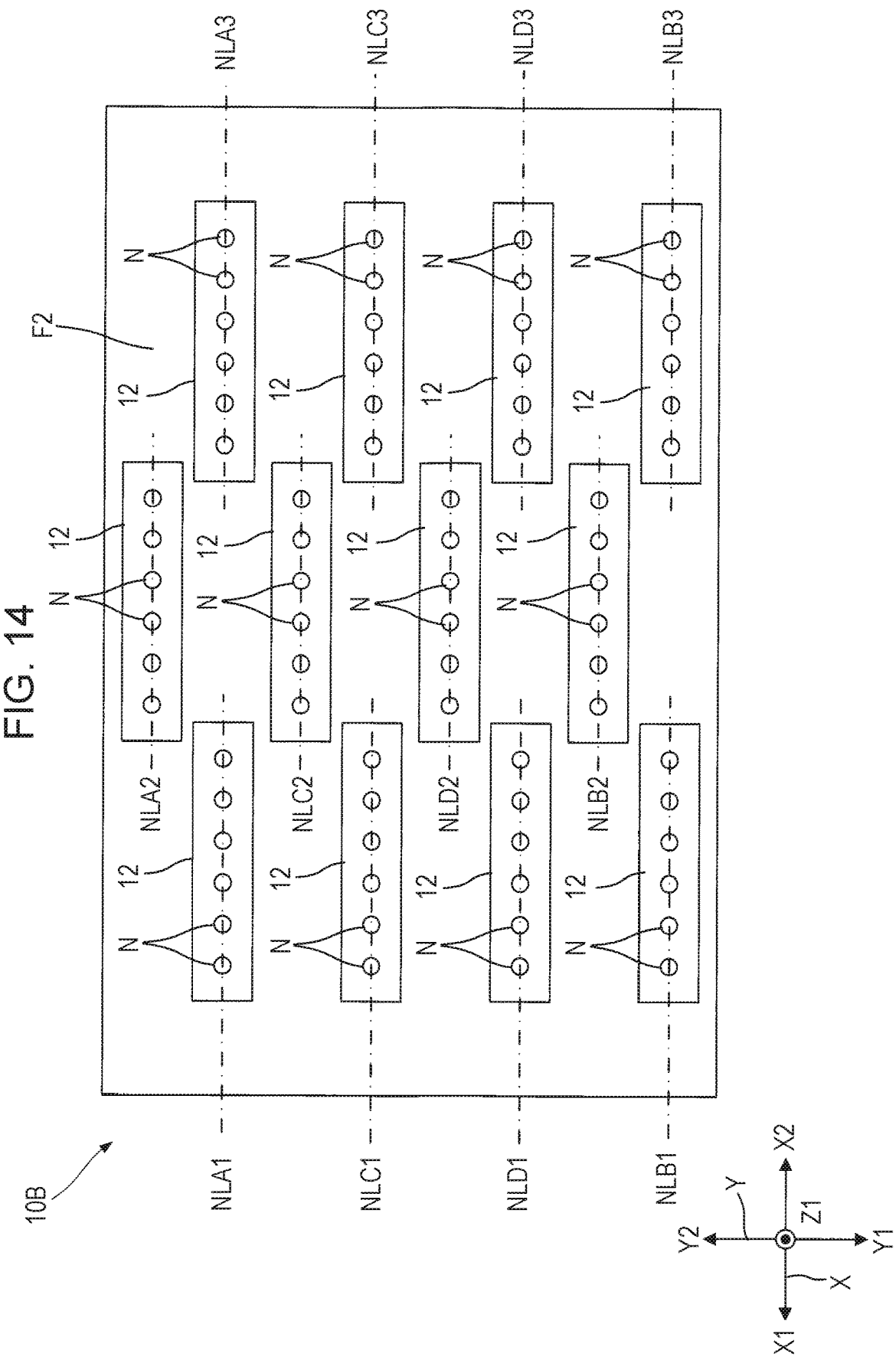
FIG. 14 is a bottom view showing an ejection surface of a liquid ejecting head according to modification example 1.

Next, disposition of the nozzle rows NL of a liquid ejecting head 10B according to modification example 1 will be described with reference to FIG. 14. FIG. 14 is a bottom view showing an ejection surface F2 of the liquid ejecting head 10B according to modification example 1. The liquid ejecting head 10B has the plurality of nozzle rows NL. The nozzle rows NL include nozzle rows NLA1, NLA2, and NLA3 for ejecting the first ink, nozzle rows NLB1, NLB2, and NLB3 for ejecting the second ink, nozzle rows NLC1, NLC2, and NLC3 for ejecting the third ink, and nozzle rows NLD1, NLD2, and NLD3 for ejecting the fourth ink. When not distinguishing between the nozzle rows NLA1, NLA2, NLA3, NLB1, NLB2, NLB3, NLC1, NLC2, NLC3, NLD1, NLD2, and NLD3, the nozzle rows will be described as the nozzle rows NL in some cases. In the liquid ejecting head 10B, the nozzle row NLA is an example of a first nozzle row, the nozzle row NLB is an example of a second nozzle row, the nozzle row NLC is an example of a third nozzle row, and the nozzle row NLD is an example of a fourth nozzle row.

The liquid ejecting head 10B has a plurality of head chips 12. The head chip 12 is provided with a nozzle plate in which the nozzle N is formed. The head chip 12 is provided with the nozzle row NL for ejecting one type of ink. The head chip 12 has a pressure chamber (not shown) and an actuator (not shown). As the actuator raises the pressure of the ink in the pressure chamber, the ink is ejected from the nozzle N.

The nozzle rows NLA1, NLA2, and NLA3 are disposed at positions different from each other in the X-axis direction. The nozzle rows NLA1 and NLA3 and the nozzle row NLA2 are disposed at positions different from each other in the Y-axis direction. The nozzle row NLA2 is positioned in the Y2 direction with respect to the nozzle rows NLA1 and NLA3. In the first posture P1 of the liquid ejecting head 10B, the nozzle row NLA2 is positioned above the nozzle rows NLA1 and NLA3 in the gravity direction G1. In the first posture P1, an ejection surface F2 is in a state of being inclined with respect to the horizontal plane.

Disposition of the nozzle rows NLB1, NLB2, and NLB3 is the same as the disposition of the nozzle rows NLA1, NLA2, and NLA3. The nozzle rows NLB1, NLB2, and NLB3 and the nozzle rows NLA1, NLA2, and NLA3 are spaced apart from each other in the Y-axis direction.

Disposition of the nozzle rows NLC1, NLC2, and NLC3 is the same as the disposition of the nozzle rows NLA1, NLA2, and NLA3. The nozzle rows NLC1, NLC2, and NLC3 are positioned between the nozzle rows NLA1, NLA2, and NLA3 and the nozzle rows NLB1, NLB2, and NLB3 in the Y-axis direction.

Disposition of the nozzle rows NLD1, NLD2, and NLD3 is the same as the disposition of the nozzle rows NLA1, NLA2, and NLA3. The nozzle rows NLD1, NLD2, and NLD3 are positioned between the nozzle rows NLC1, NLC2, and NLC3 and the nozzle rows NLB1, NLB2, and NLB3 in the Y-axis direction.

The liquid ejecting apparatus 1 may include the liquid ejecting head 10B instead of the liquid ejecting head 10. The liquid ejecting apparatus 1 including the liquid ejecting head 10B achieves the same operational effects as the liquid ejecting apparatus 1 including the liquid ejecting head 10.

Figure 15:
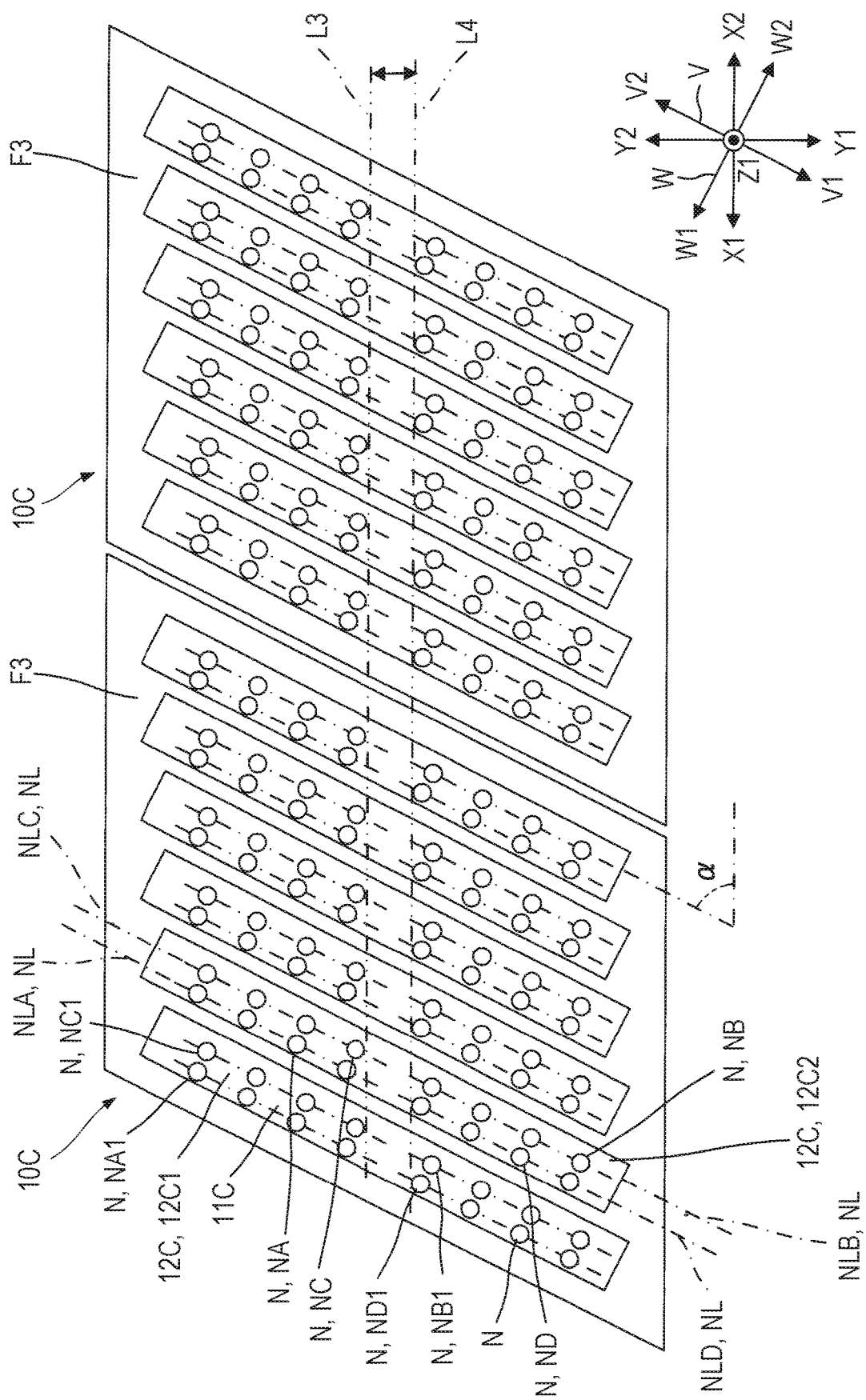
FIG. 15 is a bottom view showing an ejection surface of a liquid ejecting head according to modification example 2.

Next, disposition of the nozzle rows NL of a liquid ejecting head 10C according to modification example 2 will be described with reference to FIG. 15. FIG. 15 is a bottom view showing an ejection surface F3 of the liquid ejecting head 10C according to modification example 2. The liquid ejecting head 10C has the plurality of nozzle rows NL. The nozzle rows NL include the nozzle row NLA for ejecting the first ink, the nozzle row NLB for ejecting the second ink, the nozzle row NLC for ejecting the third ink, and the nozzle row NLD for ejecting the fourth ink. When not distinguishing between the nozzle rows NLA, NLB, NLC, and NLD, the nozzle rows will be described as the nozzle rows NL in some cases.

The liquid ejecting head 10C has a plurality of head chips 12C. The head chip 12C is provided with a nozzle plate 11C in which the nozzle N is formed. The head chip 12C is provided with each of the nozzle rows NLA, NLB, NLC, and NLD.

FIG. 15 shows a V-axis direction and a W-axis direction that are orthogonal to each other. The V-axis direction and the W-axis direction are orthogonal to the Z-axis direction. The V-axis direction and the W-axis direction are directions having the ejection surface F3 as reference. The V-axis direction includes a V1 direction and a V2 direction. The W-axis direction includes a W1 direction and a W2 direction. The V-axis direction intersects the X-axis direction at an inclination angle α.

The plurality of nozzle rows NL extend along the V-axis direction. The nozzles N included in the nozzle row NL are arranged in the V-axis direction. The nozzle row NLA and the nozzle row NLD are arranged in the V-axis direction. The nozzle row NLA and the nozzle row NLD are spaced apart from each other in the V-axis direction. The nozzle row NLA and the nozzle row NLD are spaced apart from each other in the Y-axis direction. In FIG. 15, imaginary lines L3 and L4 are shown by two-dot chain lines. The imaginary lines L3 and L4 are straight lines that are spaced apart from each other in the Y-axis direction and follow the X-axis direction. The imaginary line L3 is positioned in the Y2 direction with respect to the imaginary line L4. The nozzle rows NLA and NLC are positioned in the Y2 direction with respect to the imaginary line L3, and the nozzle rows NLB and NLD are positioned in the Y1 direction with respect to the imaginary line L4.

The nozzle row NLC and the nozzle row NLB are arranged in the V-axis direction. The nozzle row NLC and the nozzle row NLB are spaced apart from each other in the V-axis direction. The nozzle row NLC and the nozzle row NLB are spaced apart from each other in the Y-axis direction. In the liquid ejecting head 10C, the nozzle rows NLA and NLC are examples of the first nozzle row, and the nozzle rows NLD and NLB are examples of the second nozzle row.

When viewed in the Y-axis direction, the nozzle row NLA and the nozzle rows NLD and NLB at least partially overlap each other. For example, among two head chips 12C adjacent to each other in the X-axis direction, a head chip disposed in the X1 direction will be defined as a head chip 12C1, and a head chip disposed in the X2 direction with respect to the head chip 12C1 will be defined as a head chip 12C2. When viewed in the Y-axis direction, the nozzle row NLA of the head chip 12C1 and the nozzle rows NLD and NLB of the head chip 12C2 at least partially overlap each other. The nozzle row NLA and the nozzle rows NLD and NLB in the same head chip 12 may at least partially overlap each other in the Y-axis direction.

Similarly, when viewed in the Y-axis direction, the nozzle row NLC and the nozzle rows NLD and NLB at least partially overlap each other. When viewed in the Y-axis direction, the nozzle row NLC of the head chip 12C1 and the nozzle rows NLD and NLB of the head chip 12C2 at least partially overlap each other. The nozzle row NLC and the nozzle rows NLD and NLB in the same head chip 12 may at least partially overlap each other in the Y-axis direction.

When viewed in the X-axis direction, the nozzle row NLA and the nozzle rows NLD and NLB are disposed at intervals in the Y-axis direction. When viewed in the X-axis direction, the nozzle row NLC and the nozzle rows NLD and NLB are disposed at intervals in the Y-axis direction.

In the Y-axis direction, an interval between the nozzle row NLA and the nozzle row NLC that are provided in the same head chip 12C is narrower than an interval between the nozzle row NLC provided in the head chip 12C1 and the nozzle row NLA provided in the head chip 12C2.

A nozzle NA1 positioned at an upper end of the nozzle row NLA in the gravity direction G1 is positioned above a nozzle ND1 positioned at an upper end of the nozzle row NLD and a nozzle NB1 positioned at an upper end of the nozzle row NLB in the gravity direction G1.

A nozzle NC1 positioned at an upper end of the nozzle row NLC in the gravity direction G1 is positioned above the nozzle ND1 positioned at the upper end of the nozzle row NLD and the nozzle NB1 positioned at the upper end of the nozzle row NLB in the gravity direction G1.

The liquid ejecting apparatus 1 including such a liquid ejecting head 10C achieves the same operational effects as the liquid ejecting apparatus 1 including the liquid ejecting head 10.

When an effect of variations in the water head difference described above is considered as a problem in the liquid ejecting head 10C including the nozzle rows NL at least partially overlapping each other in the gravity direction G1, it is desirable to determine a height relationship between the nozzle rows NL at least partially overlapping each other by comparing the positions of the nozzles N at the upper ends of the respective nozzle rows NL in the gravity direction G1. This is because the nozzle N positioned at the upper end of the nozzle row NL is the nozzle N to which an ink is most difficult to be supplied due to a water head difference. Thus, it is desirable to compare the heights of the nozzles N positioned at the upper ends such that the first ink can be supplied to the nozzle N to which the ink is most difficult to be supplied.

As shown in FIG. 15, the liquid ejecting head 10C includes the nozzle row NLA and the nozzle row NLC at least partially overlapping each other in the gravity direction G1 and the nozzle row NLB and the nozzle row NLD at least partially overlapping each other in the gravity direction G1. Since the nozzle NA1 positioned at the upper end of the nozzle row NLA is positioned above the nozzle NC1 positioned at the upper end of the nozzle row NLC and the nozzle ND1 positioned at the upper end of the nozzle row NLD is positioned above the nozzle NB1 positioned at the upper end of the nozzle row NLB, the nozzle row NLA may be an example of the first nozzle row, the nozzle row NLB may be an example of the second nozzle row, the nozzle row NLC may be an example of the third nozzle row, and the nozzle row NLD may be an example of the fourth nozzle row.

When color mixing caused by a plurality of types of ink droplets being overflowed from each nozzle row NL along the ejection surface F3 described above is considered as a problem in the liquid ejecting head 10C including the nozzle rows NL at least partially overlapping each other in the gravity direction G1, it is desirable to determine a height relationship between the nozzle rows NL at least partially overlapping each other by comparing the nozzles N positioned at the same position on an X-axis in an extending direction of an intersection line between the ejection surface F3 in the inclined posture of each nozzle row NL and the horizontal plane F0. This is because the intersection line between the ejection surface F3 in the inclined posture and the horizontal plane F0 follows the X-axis. Thus, an ink overflowed from the nozzle N tends to drip on the ejection surface F3 in the Y1 direction by the action of gravity.

In addition, a problem of color mixing caused by dripping of an ink is likely to occur in the same head chip 12C. In the present modification example, in the same head chip 12C, the nozzle row NLA and the nozzle row NLC at least partially overlap each other in the gravity direction G1, and the nozzle row NLB and the nozzle row NLD at least partially overlap each other in the gravity direction G1.

Herein, when the nozzle NA of the nozzle row NLA and the nozzle NC of the nozzle row NLC that are positioned in the same head chip 12C and are at the same position on the X-axis are compared to each other, since the nozzle NA of the nozzle row NLA is positioned above the nozzle NC of the nozzle row NLC, the nozzle row NLA may be a nozzle row above the nozzle row NLC. Similarly, when the nozzle ND of the nozzle row NLD and the nozzle NB of the nozzle row NLB that are positioned in the same head chip 12C and are at the same position on the X-axis are compared to each other, since the nozzle ND of the nozzle row NLD is positioned above the nozzle NB of the nozzle row NLB, the nozzle row NLD may be a nozzle row above the nozzle row NLB. As described above, the nozzle row NLA may be an example of the first nozzle row, the nozzle row NLB may be an example of the second nozzle row, the nozzle row NLC may be an example of the third nozzle row, and the nozzle row NLD may be an example of the fourth nozzle row.

Figure 16:
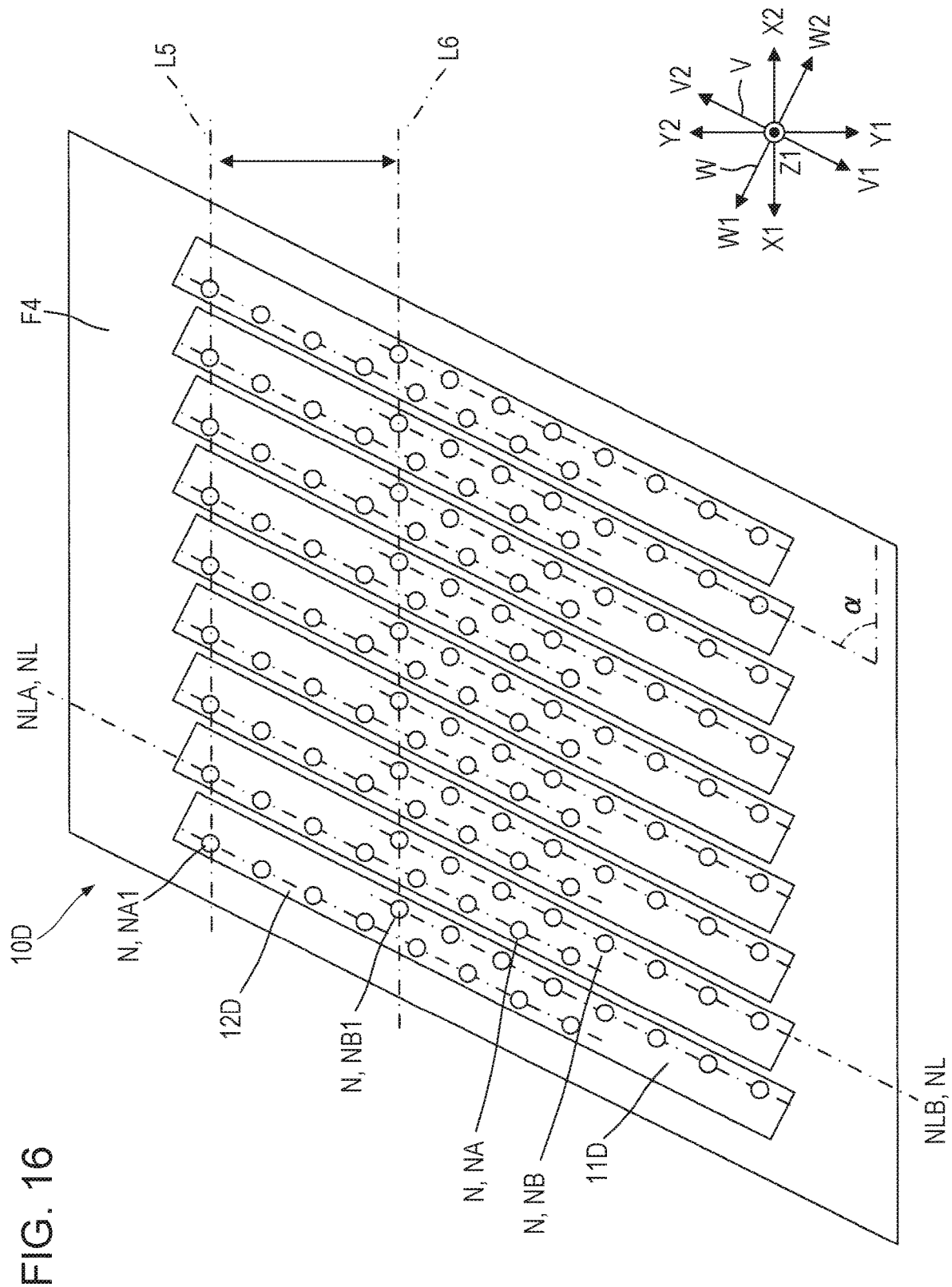
FIG. 16 is a bottom view showing an ejection surface of a liquid ejecting head according to modification example 3.

Next, disposition of the nozzle rows NL of a liquid ejecting head 10D according to modification example 3 will be described with reference to FIG. 16. FIG. 16 is a bottom view showing an ejection surface F4 of the liquid ejecting head 10D according to modification example 3. The liquid ejecting head 10D has the plurality of nozzle rows NL. The nozzle rows NL includes the nozzle row NLA for ejecting the first ink and the nozzle row NLB for ejecting the second ink. When not distinguishing between the nozzle rows NLA and NLB, the nozzle rows will be described as the nozzle rows NL in some cases.

The liquid ejecting head 10D has a plurality of head chips 12D. The head chip 12D is provided with a nozzle plate 11D in which the nozzle N is formed. The head chip 12D is provided with each of the nozzle rows NLA and NLB.

The plurality of nozzle rows NL extend along the V-axis direction. The nozzles N included in the nozzle row NL are arranged in the V-axis direction. The nozzle rows NLA and NLB are disposed at positions different from each other in the W-axis direction. When viewed in the W-axis direction, the nozzle rows NLA and NLB at least partially overlap each other. When viewed in the Y-axis direction, the nozzle row NLA and the nozzle row NLB at least partially overlap each other. When viewed in the X-axis direction, the nozzle row NLA and the nozzle row NLB at least partially overlap each other.

When viewed in the X-axis direction, the nozzle row NLA and the nozzle row NLB at least partially overlap each other, that is, the nozzle row NLA and the nozzle row NLB at least partially overlap each other in the gravity direction G1. The nozzle NA1 positioned at the upper end of the nozzle row NLA in the gravity direction G1 is positioned above the nozzle NB1 positioned at the upper end of the nozzle row NLB in the gravity direction G1.

In addition, when the nozzle NA of the nozzle row NLA and the nozzle NB of the nozzle row NLB that are positioned in the same head chip 12D and are at the same position on the X-axis are compared to each other, the nozzle NA of the nozzle row NLA is positioned above the nozzle NB of the nozzle row NLB. For this reason, even when considering any one of a problem of variations in a water head difference between the pressure adjusting portion 8 and the nozzle row NL and a problem of overflowing of an ink on the ejection surface F4 and occurrence of color mixing, the nozzle row NLA may be an example of the first nozzle row, and the nozzle row NLB may be an example of the second nozzle row in the liquid ejecting head 10D, as in modification example 2 described above.

In FIG. 16, imaginary lines L5 and L6 are shown by two-dot chain lines. The imaginary lines L5 and L6 are straight lines that are spaced apart from each other in the Y-axis direction and follow the X-axis direction. The imaginary line L5 is positioned in the Y2 direction with respect to the imaginary line L6. When viewed in the Z-axis direction, the imaginary line L5 overlaps the nozzle NA1, and the imaginary line L6 overlaps the nozzle NB1. The nozzle row NLA includes a portion disposed in the Y2 direction with respect to the imaginary line L6.

The liquid ejecting apparatus 1 including such a liquid ejecting head 10D achieves the same operational effects as the liquid ejecting apparatus 1 including the liquid ejecting head 10.

Figure 17:
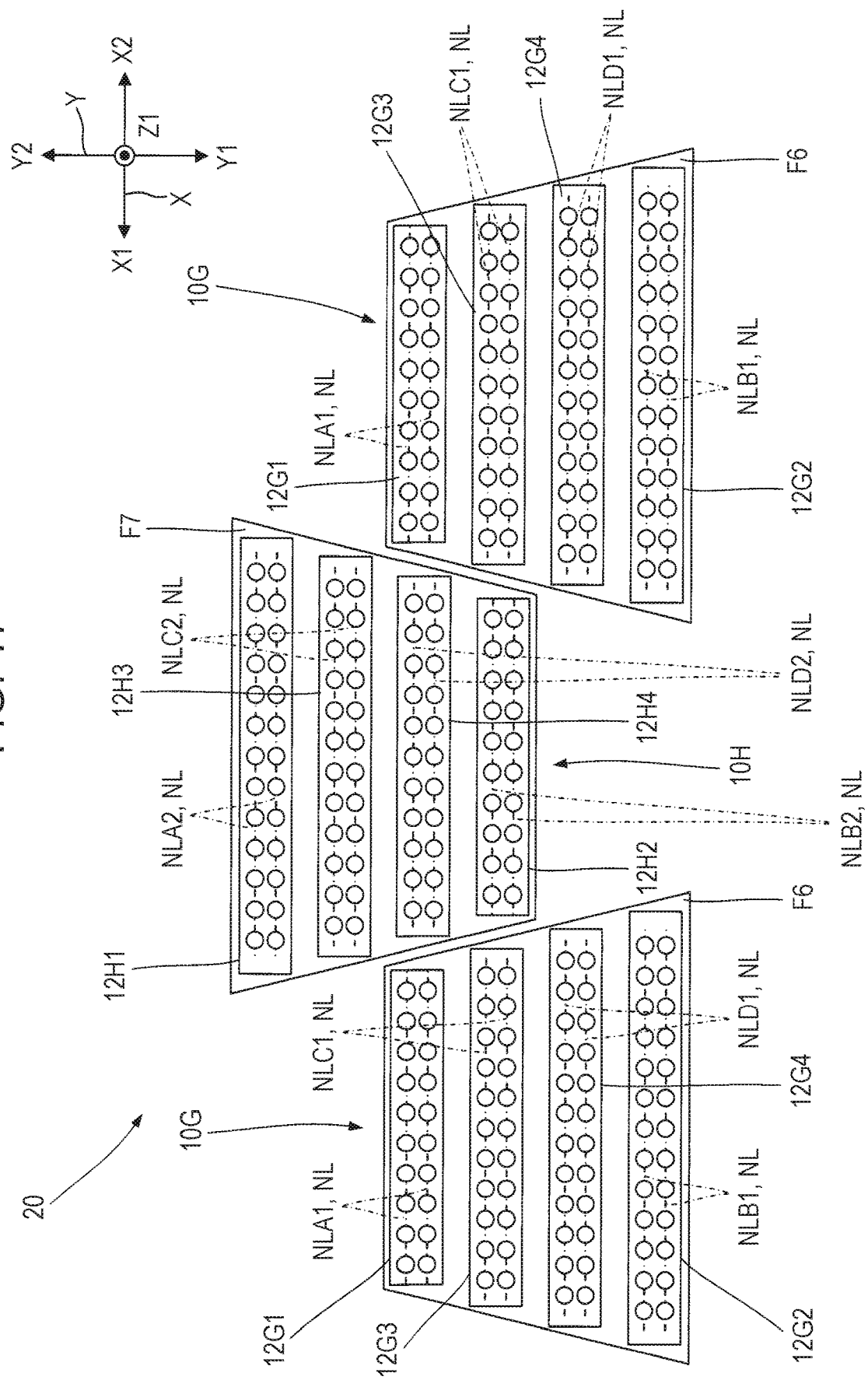
FIG. 17 is a bottom view showing an ejection surface of a liquid ejecting head according to modification example 4.

Next, disposition of the nozzle rows NL of liquid ejecting heads 10G and 10H according to modification example 4 will be described with reference to FIG. 17. FIG. 17 is a bottom view showing ejection surfaces of the liquid ejecting heads 10G and 10H according to modification example 4. The liquid ejecting apparatus 1 shown in FIG. 1 may include a head unit 20 having a plurality of liquid ejecting heads 10G and 10H instead of the liquid ejecting head 10. The head unit 20 has the plurality of liquid ejecting heads 10G and 10H alternately arranged in the X-axis direction. FIG. 17 shows the plurality of liquid ejecting heads 10G and the liquid ejecting head 10H disposed between the plurality of liquid ejecting heads 10G.

The liquid ejecting head 10G includes, as the plurality of nozzle rows NL, the nozzle row NLA1 for ejecting the first ink, the nozzle row NLB1 for ejecting the second ink, the nozzle row NLC1 for ejecting the third ink, and the nozzle row NLD1 for ejecting the fourth ink.

The liquid ejecting head 10G has a plurality of head chips 12G1, 12G2, 12G3, and 12G4. The head chip 12G1 is provided with the nozzle row NLA1, the head chip 12G2 is provided with the nozzle row NLB1, the head chip 12G3 is provided with the nozzle row NLC1, and the head chip 12G4 is provided with the nozzle row NLD1.

In the liquid ejecting head 10G, the nozzle row NLA1 is an example of the first nozzle row, the nozzle row NLB1 is an example of the second nozzle row, the nozzle row NLC1 is an example of the third nozzle row, and the nozzle row NLD1 is an example of the fourth nozzle row. The plurality of nozzle rows NLA1, NLB1, NLC1, and NLD1 extend in the X-axis direction. The nozzle row NLA1, the nozzle row NLC1, the nozzle row NLD1, and the nozzle row NLB1 are disposed in this order in the Y1 direction. The nozzle row NLB1 is longer than the nozzle row NLD1 regarding the X-axis direction. The nozzle row NLD1 is longer than the nozzle row NLC1 regarding the X-axis direction. The nozzle row NLC1 is longer than the nozzle row NLA1 regarding the X-axis direction. The nozzle row NLB1 is longer than the nozzle row NLA1 regarding the X-axis direction. In an inclined posture of the head unit 20, the nozzle row NLA1 is disposed at a position higher than the nozzle row NLC1, the nozzle row NLC1 is disposed at a position higher than the nozzle row NLD1, and the nozzle row NLD1 is disposed at a position higher than the nozzle row NLB1.

The liquid ejecting head 10H includes, as the plurality of nozzle rows NL, the nozzle row NLA2 for ejecting the first ink, the nozzle row NLB2 for ejecting the second ink, the nozzle row NLC2 for ejecting the third ink, and the nozzle row NLD2 for ejecting the fourth ink.

The liquid ejecting head 10H has a plurality of head chips 12H1, 12H2, 12H3, and 12H4. The head chip 12H1 is provided with the nozzle row NLA2, the head chip 12H2 is provided with the nozzle row NLB2, the head chip 12H3 is provided with the nozzle row NLC2, and the head chip 12H4 is provided with the nozzle row NLD2.

In the liquid ejecting head 10H, the nozzle row NLA2 is an example of the first nozzle row, the nozzle row NLB2 is an example of the second nozzle row, the nozzle row NLC2 is an example of the third nozzle row, and the nozzle row NLD2 is an example of the fourth nozzle row. The plurality of nozzle rows NLA2, NLB2, NLC2, and NLD2 extend in the X-axis direction. The nozzle row NLA2, the nozzle row NLC2, the nozzle row NLD2, and the nozzle row NLB2 are disposed in this order in the Y1 direction. The nozzle row NLA2 is longer than the nozzle row NLC2 regarding the X-axis direction. The nozzle row NLC2 is longer than the nozzle row NLD2 regarding the X-axis direction. The nozzle row NLD2 is longer than the nozzle row NLB2 regarding the X-axis direction. The nozzle row NLA2 is longer than the nozzle row NLB2 regarding the X-axis direction. In the inclined posture of the head unit 20, the nozzle row NLA2 is disposed at a position higher than the nozzle row NLC2, the nozzle row NLC2 is disposed at a position higher than the nozzle row NLD2, and the nozzle row NLD2 is disposed at a position higher than the nozzle row NLB2.

The liquid ejecting apparatus 1 including such liquid ejecting heads 10G and 10H achieves the same operational effects as the liquid ejecting apparatus 1 including the liquid ejecting head 10.

Figure 18:
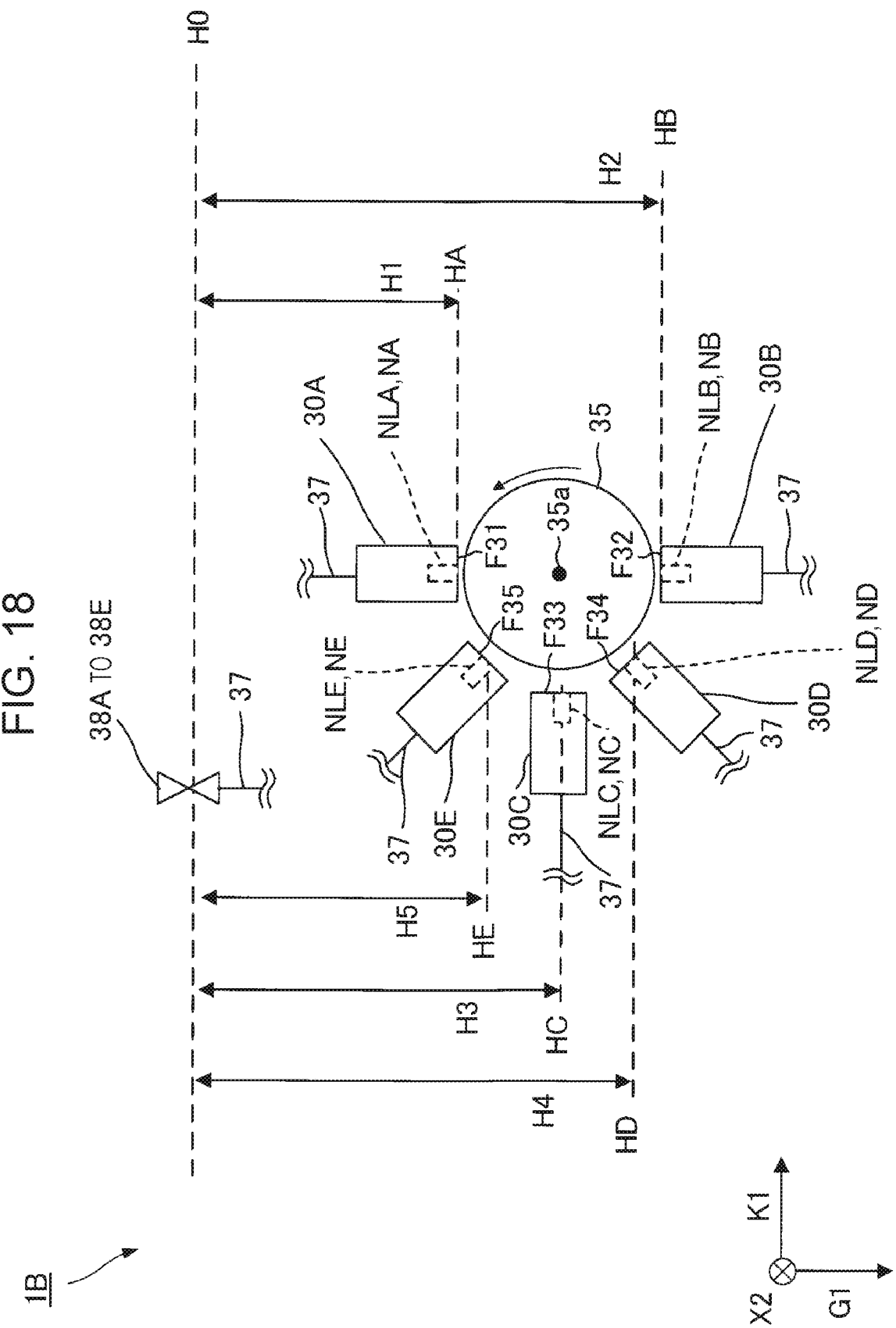
FIG. 18 is a schematic view showing a liquid ejecting apparatus according to a second embodiment.

Next, a liquid ejecting apparatus 1B according to a second embodiment will be described with reference to FIG. 18. FIG. 18 is a schematic view showing the liquid ejecting apparatus 1B according to the second embodiment. The liquid ejecting apparatus 1B includes a plurality of liquid ejecting heads 30A to 30E, a drum 35 that transports the medium PA, and pressure adjusting portions 38A to 38E. In the description of the second embodiment, the same description as in the first embodiment will be omitted. As described above, the X-axis direction, the Y-axis direction, and the Z-axis direction, which are shown in each drawing, differ according to the postures of the liquid ejecting heads 30A to 30E. The drum 35 may be an intermediate transfer body on which an ink ejected from the liquid ejecting heads 30A to 30E lands.

The drum 35 rotates around a rotation shaft 35a extending in the X-axis direction. The medium PA is transported with the rotation of the drum 35. The medium PA passes through positions corresponding to the liquid ejecting heads 30A to 30E. An ink is ejected from the liquid ejecting heads 30A to 30E to the moving medium PA.

The plurality of liquid ejecting heads 30A to 30E are disposed at positions different from each other in a circumferential direction of the drum 35. Ejection surfaces F31 to F35 of the liquid ejecting heads 30A to 30E are disposed at angles different from each other. The ejection surfaces F31 to F35 are surfaces of nozzle plates.

Figure 19:
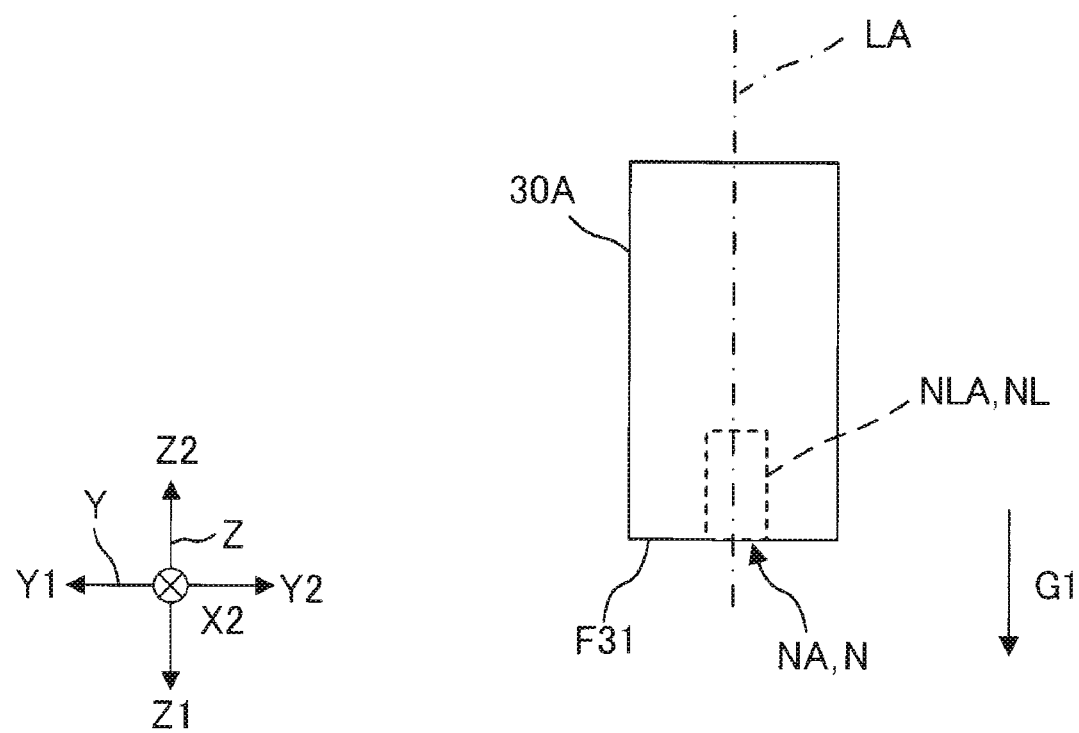
FIG. 19 is a schematic view showing disposition of the liquid ejecting head.

FIG. 19 is a schematic view showing the posture of the liquid ejecting head 30A. The liquid ejecting head 30A has the nozzle row NLA for ejecting the first ink. The nozzle row NLA is formed on the ejection surface F31 of the liquid ejecting head 30A. The plurality of nozzles NA included in the nozzle row NLA are arranged in the X-axis direction. An LA direction perpendicular to the ejection surface F31 follows the gravity direction G1. An ink ejected from the nozzles NA of the liquid ejecting head 30A flies downward along the gravity direction G1.

Figure 20:
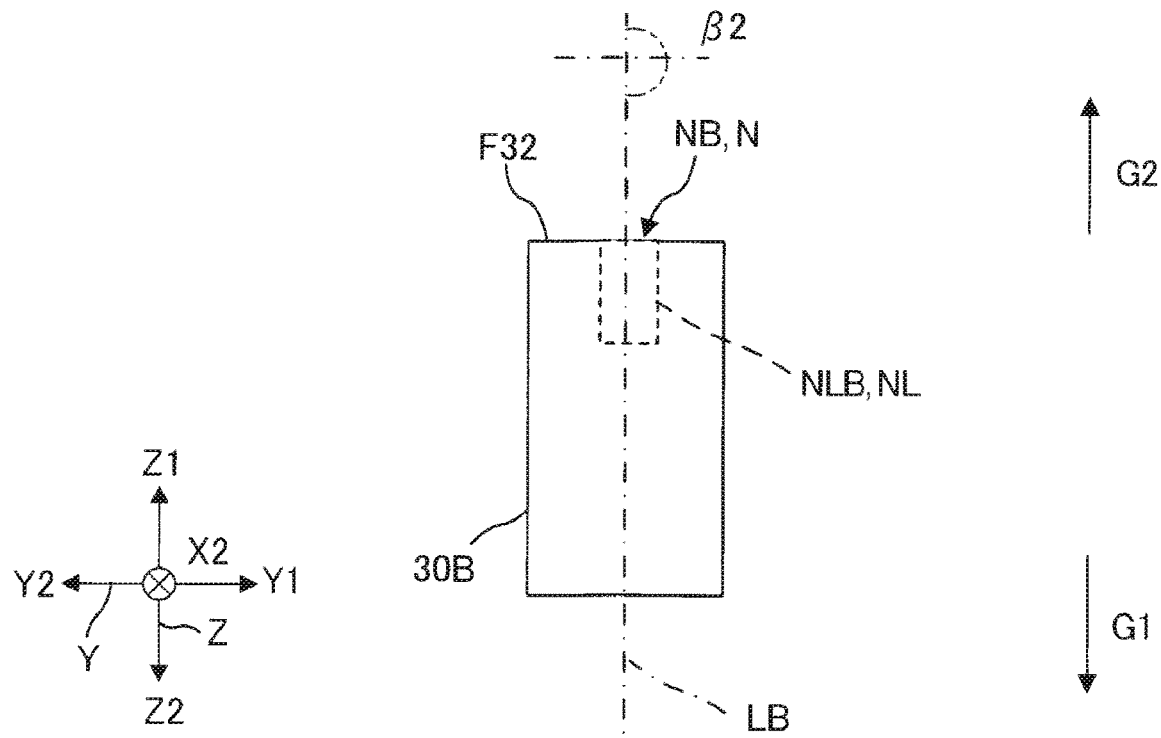
FIG. 20 is a schematic view showing disposition of the liquid ejecting head.

FIG. 20 is a schematic view showing the posture of the liquid ejecting head 30B. The liquid ejecting head 30B has the nozzle row NLB for ejecting the second ink. The nozzle row NLB is formed on the ejection surface F32 of the liquid ejecting head 30B. The plurality of nozzles NB included in the nozzle row NLB are arranged in the X-axis direction. An LB direction perpendicular to the ejection surface F32 follows the gravity direction G1. FIG. 20 shows the upward direction G2 that is an opposite direction to the gravity direction G1. An ink ejected from the nozzles NB of the liquid ejecting head 30B flies in the upward direction G2.

The liquid ejecting head 30A is an example of a first liquid ejecting head, and the liquid ejecting head 30B is an example of a second liquid ejecting head. The ejection surface F31 is an example of a first ejection surface, and the ejection surface F32 is an example of a second ejection surface. The nozzle NA is an example of a first nozzle that ejects the first ink, and the nozzle NB is an example of a second nozzle that ejects the second ink. The dynamic surface tension of the first ink is higher than the dynamic surface tension of the second ink.

In the liquid ejecting head 30A shown in FIG. 19, an angle β1 formed by an ejection direction of the first ink ejected from the nozzle NA and the gravity direction G1 is 0 degree. The angle β1 is an example of a first angle. In the liquid ejecting head 30B shown in FIG. 20, an angle β2 formed by an ejection direction of the second ink ejected from the nozzle NB and the gravity direction G1 is 180 degrees. The angle β2 is an example of a second angle. The angle β2 is an angle larger than the angle β1.

Figure 21:
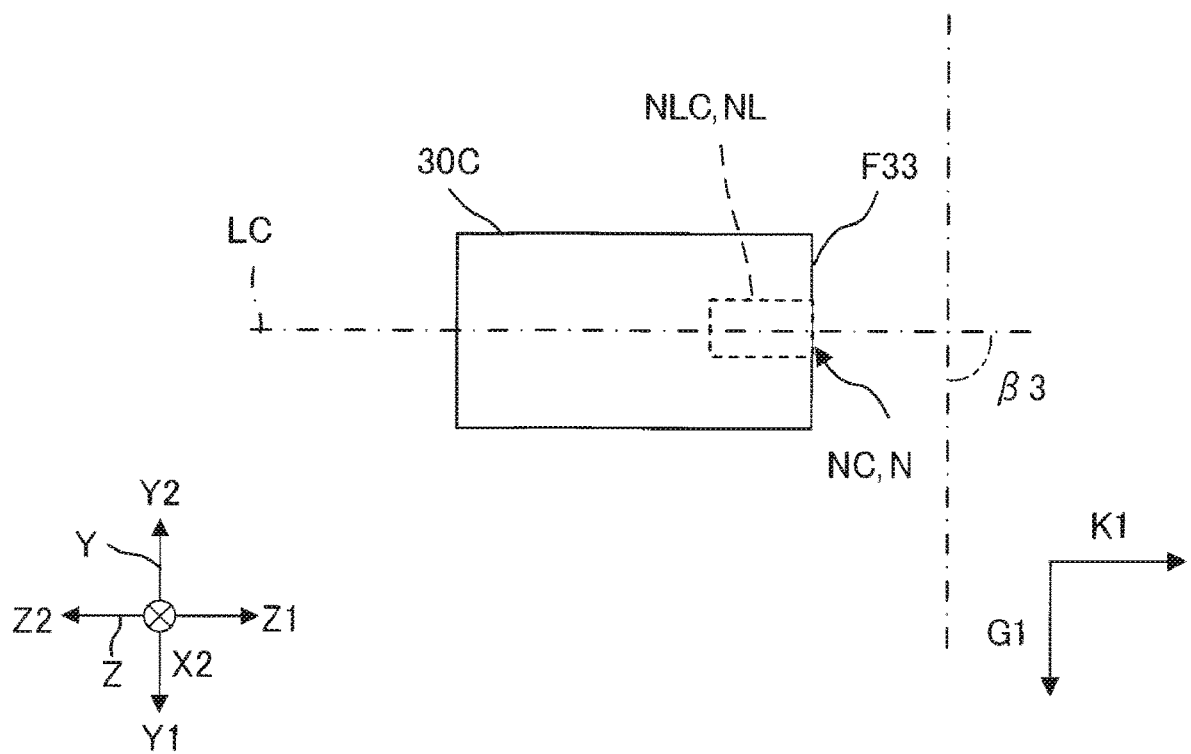
FIG. 21 is a schematic view showing disposition of the liquid ejecting head.

FIG. 21 is a schematic view showing the posture of the liquid ejecting head 30C. The liquid ejecting head 30C has the nozzle row NLC for ejecting the third ink. The nozzle row NLC is formed on the ejection surface F33 of the liquid ejecting head 30C. The plurality of nozzles NC included in the nozzle row NLC are arranged in the X-axis direction. An LC direction perpendicular to the ejection surface F33 follows the K1 direction orthogonal to the gravity direction G1. FIG. 21 shows the K1 direction orthogonal to the gravity direction G1. An ink ejected from the nozzles NC of the liquid ejecting head 30C flies along the K1 direction orthogonal to the gravity direction G1.

The liquid ejecting head 30C is an example of a third liquid ejecting head. The ejection surface F33 is an example of a third ejection surface. The nozzle NC is an example of a third nozzle that ejects the third ink. The dynamic surface tension of the third ink is lower than the dynamic surface tension of the first ink and is higher than the dynamic surface tension of the second ink.

An angle β3 formed by the K1 direction, which is an ejection direction of the third ink ejected from the nozzle NC, and the gravity direction G1 is 90 degrees. The angle β3 is an example of a third angle. The angle β3 is an angle larger than the angle β1 and is an angle smaller than the angle β2.

Figure 22:
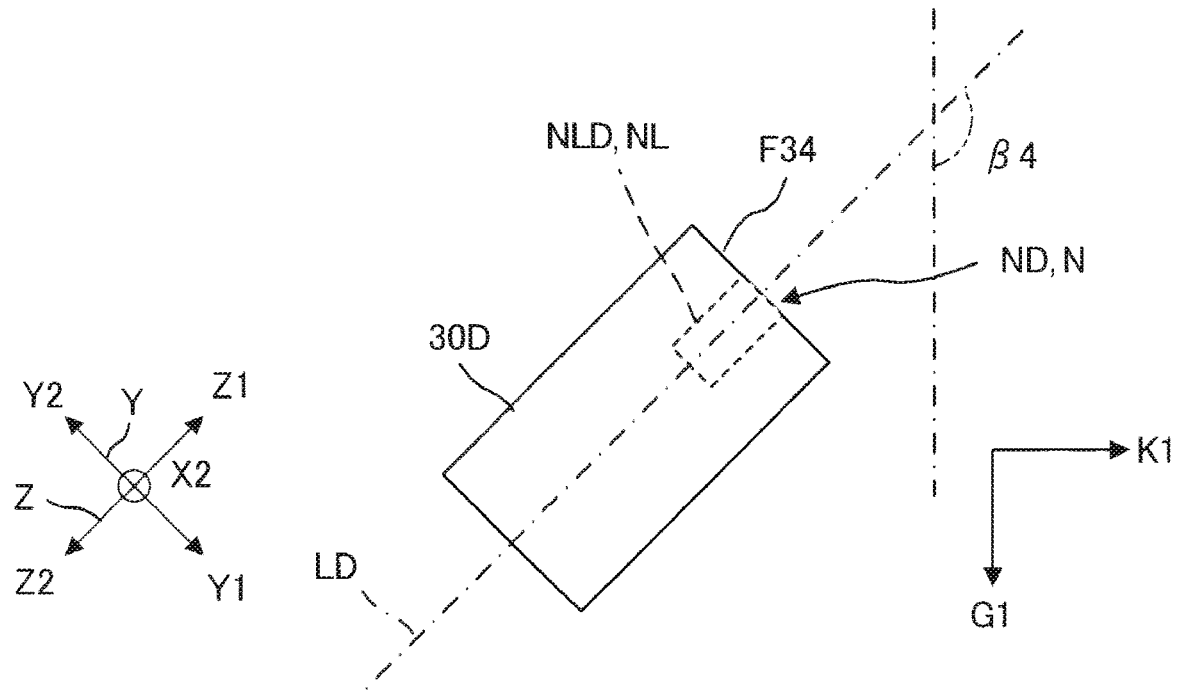
FIG. 22 is a schematic view showing disposition of the liquid ejecting head.

FIG. 22 is a schematic view showing the posture of the liquid ejecting head 30D. The liquid ejecting head 30D has the nozzle row NLD for ejecting the fourth ink. The nozzle row NLD is formed on the ejection surface F34 of the liquid ejecting head 30D. The plurality of nozzles ND included in the nozzle row NLD are arranged in the X-axis direction. An LD direction perpendicular to the ejection surface F34 follows a direction intersecting the gravity direction G1 and the K-axis direction. An ink ejected from the nozzles ND of the liquid ejecting head 30D flies in the direction intersecting the gravity direction G1 and the K-axis direction, that is, obliquely upward along the Z1 direction in FIG. 22.

The liquid ejecting head 30D is an example of a fourth liquid ejecting head. The ejection surface F34 is an example of a fourth ejection surface. The nozzle ND is an example of a fourth nozzle that ejects the fourth ink. The dynamic surface tension of the fourth ink is lower than the dynamic surface tension of the third ink and is higher than the dynamic surface tension of the second ink.

An angle β4 formed by an ejection direction of the fourth ink ejected from the nozzle ND, which is the Z1 direction in FIG. 22, and the gravity direction G1 is 135 degrees. The angle β4 is an example of a fourth angle. The angle β4 is an angle larger than the angle β3 and is an angle smaller than the angle β2.

Figure 23:
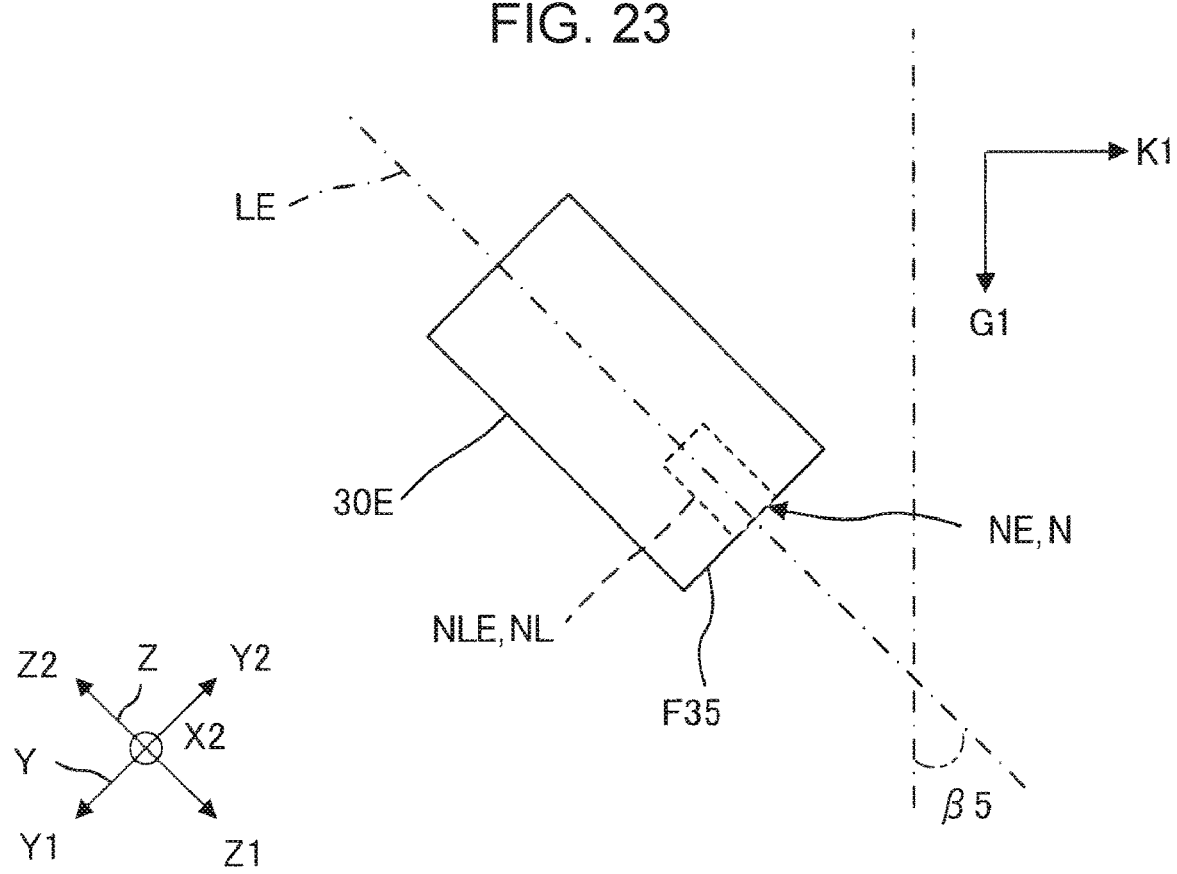
FIG. 23 is a schematic view showing disposition of the liquid ejecting head.

FIG. 23 is a schematic view showing the posture of the liquid ejecting head 30E. The liquid ejecting head 30E has the nozzle row NLE for ejecting a fifth ink. The nozzle row NLE is formed on the ejection surface F35 of the liquid ejecting head 30E. The plurality of nozzles NE included in the nozzle row NLE are arranged in the X-axis direction. An LE direction perpendicular to the ejection surface F35 follows a direction intersecting the gravity direction G1 and the K-axis direction. An ink ejected from the nozzles NE of the liquid ejecting head 30E flies in the direction intersecting the gravity direction G1 and the K-axis direction, that is, obliquely downward along the Z1 direction in FIG. 23.

The liquid ejecting head 30E is an example of a fifth liquid ejecting head. The ejection surface F35 is an example of a fifth ejection surface. The nozzle NE is an example of a fifth nozzle that ejects the fifth ink. The dynamic surface tension of the fifth ink is lower than the dynamic surface tension of the first ink and is higher than the dynamic surface tension of the third ink.

An angle β5 formed by an ejection direction of the fifth ink ejected from the nozzle NE, which is the Z1 direction in FIG. 23, and the gravity direction G1 is 45 degrees. The angle β5 is an example of a fifth angle. The angle β5 is an angle larger than the angle β1 and is an angle smaller than the angle β3.

Next, the water head differences H1 to H5 of the nozzle rows NLA to NLE will be described with reference to FIG. 18. The pressure adjusting portion 38A is coupled to the nozzle row NLA via an ink flow path 37. The pressure adjusting portion 38B is coupled to the nozzle row NLB via the ink flow path 37. The pressure adjusting portion 38C is coupled to the nozzle row NLC via the ink flow path 37. The pressure adjusting portion 38D is coupled to the nozzle row NLD via the ink flow path 37. The pressure adjusting portion 38E is coupled to the nozzle row NLE via the ink flow path 37.

The pressure adjusting portions 38A to 38E can use the same configuration as the pressure adjusting portion 8 described in the first embodiment. In addition, as in the first embodiment, the pressure adjusting portions 38A to 38E have the same configuration. The pressure adjusting portion 38A adjusts the pressure of the first ink. The pressure adjusting portion 38B adjusts the pressure of the second ink. The pressure adjusting portion 38C adjusts the pressure of the third ink. The pressure adjusting portion 38D adjusts the pressure of the fourth ink. The pressure adjusting portion 38E adjusts the pressure of the fifth ink.

FIG. 18 shows the height position H0 of each of the pressure adjusting portions 38A to 38E in the gravity direction G1. The height position H0 is positioned above the height positions HA, HB, HC, HD, and HE of the nozzle rows NLA, NLB, NLC, NLD, and NLE. The height position HA is disposed at a position higher than the height position HE. The height position HE is disposed at a position higher than the height position HC. The height position HC is disposed at a position higher than the height position HD. The height position HD is disposed at a position higher than the height position HB.

The water head difference H2 between the pressure adjusting portion 38B and the nozzle row NLB is larger than the water head difference H4 between the pressure adjusting portion 38D and the nozzle row NLD. The water head difference H4 is larger than the water head difference H3 between the pressure adjusting portion 38C and the nozzle row NLC. The water head difference H3 is larger than the water head difference H5 between the pressure adjusting portion 38E and the nozzle row NLE. The water head difference H5 is larger than the water head difference H1 between the pressure adjusting portion 38A and the nozzle row NLA. That is, the water head difference H2 is larger than the water head difference H4, the water head difference H4 is larger than the water head difference H3, the water head difference H3 is larger than the water head difference H5, and the water head difference H5 is larger than the water head difference H1.

Even such a liquid ejecting apparatus 1B according to the second embodiment achieves the same operational effects as the liquid ejecting apparatus 1 of the first embodiment.

In the liquid ejecting apparatus 1B, positions of the nozzles NA, NB, NC, ND, and NE of the nozzle rows NLA, NLB, NLC, NLD, and NLE are different according to the dynamic surface tension of an ink. The nozzle NA of the nozzle row NLA for ejecting the first ink having the highest dynamic surface tension is disposed at a position higher than the nozzles NB, NC, ND, and NE of the other nozzle rows NLB, NLC, NLD, and NLE in the gravity direction G1. That is, the first ink that is easier to be supplied is supplied to the nozzle NA of the nozzle row NLA which has the small water head difference H1 and to which the ink is difficult to be supplied.

In the liquid ejecting apparatus 1B, the nozzle NB of the nozzle row NLB for ejecting the second ink having the lowest dynamic surface tension is disposed at a position lower than the nozzles NA, NC, ND, and NE of the other nozzle rows NLA, NLC, NLD, and NLE in the gravity direction G1. The second ink that is more difficult to be ejected and supplied is supplied to the nozzle NB of the nozzle row NLB which has the large water head difference H2 and to which the ink is easy to be supplied.

In the liquid ejecting apparatus 1B, since the nozzle NA of the nozzle row NLA for ejecting the first ink having a higher dynamic surface tension is positioned above the nozzle NB of the nozzle row NLB for ejecting the second ink having a lower dynamic surface tension in the gravity direction G1, variations in supply characteristics of an ink to the plurality of nozzle rows NL for ejecting different types of inks can be reduced, and variations in ejection characteristics of an ink in the plurality of nozzle rows NL can be suppressed. As a result, the printing accuracy of the liquid ejecting apparatus 1B can be improved.

In the liquid ejecting apparatus 1B, the nozzle NC of the nozzle row NLC for ejecting the third ink is positioned between the nozzle NA of the nozzle row NLA and the nozzle NB of the nozzle row NLB in the gravity direction G1. The third ink having a dynamic surface tension lower than the first ink is supplied to the nozzle NC of the nozzle row NLC having the water head difference H3 larger than the water head difference H1. The third ink having a dynamic surface tension higher than the second ink is supplied to the nozzle NC of the nozzle row NLC having the water head difference H3 smaller than the water head difference H2.

In the liquid ejecting apparatus 1B, the nozzle ND of the nozzle row NLD for ejecting the fourth ink is positioned between the nozzle NC of the nozzle row NLC and the nozzle NB of the nozzle row NLB in the gravity direction G1. The fourth ink having a dynamic surface tension lower than the third ink is supplied to the nozzle ND of the nozzle row NLD having the water head difference H4 larger than the water head difference H3. The fourth ink having a dynamic surface tension higher than the second ink is supplied to the nozzle ND of the nozzle row NLD having the water head difference H4 smaller than the water head difference H2.

In the liquid ejecting apparatus 1B, the nozzle NE of the nozzle row NLE for ejecting the fifth ink is positioned between the nozzle NA of the nozzle row NLA and the nozzle NC of the nozzle row NLC in the gravity direction G1. The fifth ink having a dynamic surface tension lower than the first ink is supplied to the nozzle NE of the nozzle row NLE having the water head difference H5 larger than the water head difference H1. The fifth ink having a dynamic surface tension higher than the third ink is supplied to the nozzle NE of the nozzle row NLE having the water head difference H5 smaller than the water head difference H3.

Since the height positions of the nozzles NA to NE are different from each other according to the dynamic surface tension of an ink in such a liquid ejecting apparatus 1B, variations in supply characteristics of an ink to the plurality of nozzles NA to NE for ejecting different types of inks can be reduced, and variations in ejection characteristics of an ink in the plurality of nozzles NA to NE can be suppressed. As a result, the printing accuracy of the liquid ejecting apparatus 1B can be improved.

Although the height position H0 of each of the pressure adjusting portions 38A to 38E is positioned above the height positions HA, HB, HC, HD, and HE of the nozzles NA, NB, NC, ND, and NE in the gravity direction G1 in the present embodiment, the height position H0 is not limited thereto. The height position H0 may be positioned between the height position HA and the height position HB in the gravity direction G1 or may be positioned below the height positions HA, HE, HC, HD, and HB.

The embodiments described above are merely representative forms of the present disclosure. The present disclosure is not limited to the embodiments described above, and various changes and additions are possible without departing from the gist of the present disclosure.

Although a plurality of inks having colors different from each other are given as examples in the embodiments described above, the inks are not limited thereto. For example, the first ink and the second ink may have dynamic surface tensions different from each other and may have the same color.

Although the line type liquid ejecting apparatus 1 including a line head is given as an example in the embodiments described above, the present disclosure may also be applied to a serial type liquid ejecting apparatus in which a carriage, on which the liquid ejecting head 10 is mounted, is reciprocated in the width direction of the medium PA.

The liquid ejecting apparatus 1 that is given as an example in the embodiments described above can be adopted in various types of devices such as a facsimile device and a copier in addition to a device dedicated to printing. However, the application of the liquid ejecting apparatus of the embodiments of the present disclosure is not limited to printing. For example, a liquid ejecting apparatus that discharges a color material solution is used as a manufacturing device that forms a color filter of a display device such as a liquid crystal display panel. In addition, a liquid ejecting apparatus that discharges a conductive material solution is used as a manufacturing device that forms wiring and an electrode of a wiring substrate. In addition, a liquid ejecting apparatus that discharges an organic substance solution related to a living body is used, for example, as a manufacturing device that manufactures a biochip.

What is claimed is:

1. A liquid ejecting apparatus comprising:
    a liquid ejecting head that has an ejection surface including a first nozzle row configured to eject a first ink, a second nozzle row configured to eject a second ink, and a third nozzle configured to eject a third ink, wherein
    the liquid ejecting head is configured to be held in a first posture in which the ejection surface is inclined with respect to a horizontal plane,
    a dynamic surface tension of the first ink is higher than a dynamic surface tension of the second ink,
    a dynamic surface tension of the third ink is lower than the dynamic surface tension of the first ink and is higher than the dynamic surface tension of the second ink,
    in the first posture, the first nozzle row is positioned above the second nozzle row with respect to a gravity direction, and
    in the first posture, the third nozzle row is positioned below the first nozzle row and above the second nozzle row with respect to the gravity direction.

2. The liquid ejecting apparatus according to claim 1, wherein
    a difference between the dynamic surface tension of the first ink and the dynamic surface tension of the second ink is 1.0 mN/m or larger.

3. The liquid ejecting apparatus according to claim 1, wherein
    a dynamic surface tension of the first ink at a lifetime of 10 msec is higher than a dynamic surface tension of the second ink at a lifetime of 10 msec.

4. The liquid ejecting apparatus according to claim 1, wherein
    the first nozzle row and the second nozzle row are formed on a common nozzle plate.

5. The liquid ejecting apparatus according to claim 4, wherein
    in a case where a direction in which an intersection line between the ejection surface in the first posture and the horizontal plane extends is defined as a first direction and a direction orthogonal to the first direction in the ejection surface is defined as a second direction, the first nozzle row and the second nozzle row at least partially overlap each other when viewed in the second direction.

6. The liquid ejecting apparatus according to claim 1, wherein
    a direction in which an intersection line between the ejection surface in the first posture and the horizontal plane extends is defined as a first direction, and
    the first nozzle row and the second nozzle row are disposed at an interval when viewed in the first direction.

7. The liquid ejecting apparatus according to claim 1, wherein
    a nozzle positioned at an upper end of the first nozzle row with respect to the gravity direction is positioned above, with respect to the gravity direction, a nozzle positioned at an upper end of the second nozzle row with respect to the gravity direction.

8. The liquid ejecting apparatus according to claim 1, wherein
    the ejection surface further includes a fourth nozzle row configure to eject a fourth ink,
    a dynamic surface tension of the fourth ink is higher than the dynamic surface tension of the second ink and is lower than the dynamic surface tension of the third ink, and
    in the first posture, the fourth nozzle row is positioned below the third nozzle row and above the second nozzle row with respect to the gravity direction.

9. The liquid ejecting apparatus according to claim 1, wherein
    a posture of the liquid ejecting head is configured to be changed to a plurality of postures including the first posture and a second posture different from the first posture,
    the liquid ejecting head is configured to rotate around a rotation shaft along a first direction which is an extending direction of an intersection line between the ejection surface in the first posture and the horizontal plane, and
    in a case where a line that passes through a center between the first nozzle row and the second nozzle row in the first posture and extends in a direction perpendicular to the ejection surface in the first posture when viewed in the first direction is defined as a first imaginary line, the rotation shaft is positioned on a second nozzle row side when viewed from the first imaginary line.

10. The liquid ejecting apparatus according to claim 9, wherein
    the first posture is a recording posture in which a recording operation is performed by ejecting the first ink and the second ink to a medium, and
    the second posture is a maintenance posture in which maintenance of the liquid ejecting head is performed.

11. The liquid ejecting apparatus according to claim 9, wherein
    in the second posture, the ejection surface is parallel to the horizontal plane.

12. The liquid ejecting apparatus according to claim 1, further comprising:
    a housing that accommodates the liquid ejecting head, wherein
    the housing has a first contact point that is a portion which is in contact with a floor surface in a state where the housing is mounted on the floor surface when viewed in a first direction, which is an extending direction of an intersection line between the ejection surface in the first posture and the horizontal plane, and that is positioned at one end in a third direction orthogonal to both of the first direction and the gravity direction when viewed in the first direction, and
    in the first posture, a distance between the first contact point and the first nozzle row is larger than a distance between the first contact point and the second nozzle row.

13. The liquid ejecting apparatus according to claim 12, wherein
    the housing has a second contact point that is the portion which is in contact with the floor surface in a state of being mounted on the floor surface when viewed in the first direction and that is positioned at the other end in the third direction, and when viewed in the first direction, a center of gravity of the liquid ejecting apparatus is closer to the first contact point than to the second contact point with respect to the third direction.

14. The liquid ejecting apparatus according to claim 12, wherein the housing has a second contact point that is the portion which is in contact with the floor surface in a state of being mounted on the floor surface when viewed in the first direction and that is positioned at the other end in the third direction, and in the first posture, a distance between the second contact point and the first nozzle row is larger than a distance between the second contact point and the second nozzle row.

15. A liquid ejecting apparatus comprising:

a liquid ejecting head that has an ejection surface including a first nozzle row configured to eject a first ink and a second nozzle row configured to eject a second ink, a first pressure adjusting portion that adjusts a pressure of the first ink to be supplied to the first nozzle row; and a second pressure adjusting portion that adjusts a pressure of the second ink to be supplied to the second nozzle row, wherein the liquid ejecting head is configured to be held in a first posture in which the ejection surface is inclined with respect to a horizontal plane, in the first posture, the first nozzle row is positioned above the second nozzle row with respect to a gravity direction, the first pressure adjusting portion and the second pressure adjusting portion are disposed at the same position with respect to the gravity direction, and a dynamic surface tension of the first ink is higher than a dynamic surface tension of the second ink.

16. A liquid ejecting apparatus comprising:

a first liquid ejecting head that has a first ejection surface including a first nozzle configured to eject a first ink; and a second liquid ejecting head that has a second ejection surface including a second nozzle configured to eject a second ink, the second liquid ejecting head being different from the first liquid ejecting head, wherein a dynamic surface tension of the first ink is higher than a dynamic surface tension of the second ink, the first ejection surface is disposed such that an angle formed by an ejection direction of the first ink ejected from the first nozzle and a gravity direction is a first angle, and the second ejection surface is disposed such that an angle formed by an ejection direction of the second ink ejected from the second nozzle and the gravity direction is a second angle larger than the first angle.

17. The liquid ejecting apparatus according to claim 16, further comprising:

a first pressure adjusting portion that adjusts a pressure of the first ink to be supplied to the first nozzle; and a second pressure adjusting portion that adjusts a pressure of the second ink to be supplied to the second nozzle, wherein the first pressure adjusting portion and the second pressure adjusting portion are disposed at the same position with respect to the gravity direction.

18. The liquid ejecting apparatus according to claim 16, further comprising:

a third liquid ejecting head that has a third ejection surface including a third nozzle configured to eject a third ink, the third liquid ejecting head being different from the first and second liquid ejecting heads, the third ejection surface is disposed such that an angle formed by an ejection direction of the third ink ejected from the third nozzle and the gravity direction is a third angle larger than the first angle and smaller than the second angle, and a dynamic surface tension of the third ink is lower than the dynamic surface tension of the first ink and higher than a dynamic surface tension of the second ink.

\* \* \* \* \*